(12) United States Patent
Masui et al.

(10) Patent No.: US 6,600,712 B1
(45) Date of Patent: Jul. 29, 2003

(54) OPTICAL INFORMATION RECORDING METHOD AND APPARATUS

(75) Inventors: Naruhiro Masui, Yokohama (JP); Kenya Yokoi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/334,636

(22) Filed: Jun. 17, 1999

(30) Foreign Application Priority Data

Jul. 3, 1998 (JP) ............................................. 10-189190

(51) Int. Cl.[7] ................................................. G11B 7/00
(52) U.S. Cl. ............... 369/116; 369/13.24; 369/124.05; 369/53.27; 369/47.51
(58) Field of Search ............................. 369/116, 44.14, 369/53.36, 44.31, 59.121, 47.51, 275.2, 13.24, 53.35, 47.53, 53.27, 53.29, 124.01, 124.05

(56) References Cited

U.S. PATENT DOCUMENTS

| | | | |
|---|---|---|---|
| 5,495,466 A | * 2/1996 | Dohmeier et al. | 369/116 |
| 5,608,710 A | * 3/1997 | Minemura et al. | 369/275.2 |
| 5,684,765 A | * 11/1997 | Matsumoto et al. | 369/116 |
| 5,790,491 A | * 8/1998 | Jaquette et al. | 369/116 |
| 5,798,993 A | * 8/1998 | Ohkubo et al. | 369/116 |
| 5,856,964 A | * 1/1999 | Shtipelman et al. | 369/44.14 |
| 5,903,537 A | * 5/1999 | Gage et al. | 369/116 |
| 5,974,021 A | * 10/1999 | Toda et al. | 369/116 |

FOREIGN PATENT DOCUMENTS

JP          57-60696          12/1982

* cited by examiner

Primary Examiner—William Korzuch
Assistant Examiner—Kim-Kwok Chu
(74) Attorney, Agent, or Firm—Dickstein Shapiro Morin & Oshinsky LLP

(57) ABSTRACT

An optical information recording method and apparatus which records information on a recording medium by irradiating the recording medium with an irradiation light of a recording power to form a recorded-mark on the recording medium such that reflection coefficient from an area of the recorded-mark is different than a reflection coefficient from an area of the recording medium where the recorded-mark is not formed by a changing power of the irradiation light. Information is recorded by modulating the irradiation light according to the information for recording, forming a recorded-mark on the recording medium by changing the power of the irradiation light between a recording power and a non-recording power, receiving reflection light of the irradiation light reflected by the recording medium and producing a corresponding light signal, determining a state of the recorded-mark based upon the light signal produced during a predetermined period of time immediately after the irradiation light changes from the recording power to the non-recording power, and controlling the recording power of the irradiation light according to the state of the recorded-mark.

7 Claims, 24 Drawing Sheets

OPTICAL INFORMATION RECORDING METHOD AND APPARATUS

CROSS REFERENCE TO RELATED APPLICATIONS

This application claims priority under 35 USC §119 to Japanese patent application No.10-189190 filed Jul. 3, 1998, the entire contents of which is incorporated herein by reference.

BACKGROUND OF THE INVENTION

1. Field of the Invention

The present invention relates to an optical information recording method and an apparatus, and more particularly to an optical information recording method and an apparatus provided with an improved mark-recording operation.

2. Discussion of the Background

In recent years, optical information recording apparatuses, such as a compact disk-recordable (CD-R) drive, have become commercially practical, and a study toward further increasing a storage capacity and a recording speed of the apparatuses is being continued. As recordable optical disk media, for example, a write-once optical disk medium using coloring agent compounds, a magneto-optical disk medium, and a rewritable optical disk medium using phase-change materials, are known.

In a general optical disk recording apparatus, laser light, which is emitted by a laser diode and pulse-modulated according to recording information, irradiates a recording medium, changes the reflection coefficient of the recording medium, and thereby forms a recorded-mark. The laser light power affects the quality or the state of the recorded-mark, i.e., if the quality of the recorded-mark does not satisfy the specification of a recording format, a data error occurs. Various states of the recorded-mark, for example, a horizontal shape, a cross-sectional radius of the hollow of the mark, the surface unevenness, the outline shape, the color, unevenness of the color, and so forth, are known. Therefore, hitherto, before starting an ordinary information recording operation, in order to determine a proper recording power suitable for the characteristics of a recording medium, test writing is carried out on a predetermined area of the recording medium while changing the recording power. The recording power that has recorded a signal, which is reproduced with the best symmetry, is chosen as an optimum recording power. The optimum recording power is maintained during ordinary information recording on a recording medium. This method is known as an "optimum power control" (OPC) method.

However, even when the optimum recording power, which is determined by the above-described test writing, is maintained during the ordinary information recording, other factors can disturb the accomplishment of an optimum recording. For example, the optimum recording power for recording depends upon the sensitivity of the recording medium, and therefore the optimum recording power changes according to variations in the sensitivity of the recording medium. Further, the optimum recording power changes according to a tilt of the recording medium relative to the laser light. In addition, even if a drive current of the laser diode is kept constant to keep the optimum output power for optimum recording, the actual output power of the laser diode may change due to, for example, an environmental temperature change, causing a deviation of the output power from the optimum output power for the optimum recording. In other words, even when a recording operation on a medium is performed using the conventional OPC method, an optimum recording might not be always possible throughout the whole area of the recording medium.

To solve these problems, for example, Japanese Patent Publication No.60696/1982 proposes to detect a change in reflected light of the recording light coming from the disk during an ordinary information recording operation. The output power of a light source is controlled in accordance with the result of the detection. According to this publication, while information is being recorded, the state of a recorded-mark is obtained at the same time based upon the result of detecting a change in reflected light from the disk, and thereby fluctuation of the recording power from an optimum recording power is detected. Such fluctuation may have been caused by variations in the output power of the light source in the recording operation, a tilt of the disk relative to the laser light, or variations in the sensitivity of the disk. The output power of the light source is controlled so that the fluctuation from the optimum irradiation power is compensated. More specifically, in a test writing operation, each recording power and a resulting detected signal indicating a change in the reflected light are stored in a corresponding manner, and in a normal writing, the laser diode is controlled so as to output the optimum output according to the stored information. A similar method, known as a "running-optimum power control" (R-OPC) method, is in use in some CD-R drive apparatuses.

The above method, i.e., controlling the output of a light source according to the result of detecting a change in reflected light from a recorded-mark, has however problems such that the reflected light does not change according to the recorded mark or such that the change in the reflected light can not be accurately detected under certain recording conditions or in a certain recording medium.

A reflection coefficient of a recorded area of a recording medium is different from that of the non-recorded area of a recording medium. Reflected light power is expressed as the product of irradiation light power and a reflection coefficient of a part of the recording medium covered by an irradiation light spot. During a recording operation, the irradiation light spot moves relative to the recording medium at a constant velocity on a recording track of the medium. Therefore, in the recording operation, the irradiation light spot always covers both a recorded portion, i.e., an area where a mark is formed, and a non-recorded portion of the recording medium in a certain ratio. Accordingly, the reflection coefficient of the area covered with the irradiation light spot can be determined as an average of those of the recorded portion and the not-recorded portion of the area of a recording medium covered by the irradiation light spot. However, in the recording process, the ratio of a recorded portion and a not-recorded portion of the area covered by the irradiation light spot dynamically changes for various reasons. For example, variation in the sensitivity of the recording medium changes the speed of forming the recorded mark. Accordingly, the result of detecting the change of the reflected light is apt to be influenced by any deviations in the sensitivity of the recording medium. Particularly, in a high-speed recording operation, the irradiation light spot mainly covers the non-recorded portion rather than a mark portion, and therefore, the reliability of detecting the change of the reflected light is apt to be decreased. Accordingly, the difficulty in accurately detecting the change of the reflected light increases in proportion to the recording velocity.

Further, when a multiple-pulse method, which is suited and is often utilized for a large capacity recording, is used as a method of forming a mark, a pulse train of a recording heating-pulse and a breaking bottom-power pulse is repeated in a short time. That is, the pulse is turned to the breaking pulse or the bottom-power pulse in a short time after reflected light of a recording pulse or a heating-pulse is received, and thereby reflected light is suddenly decreased. Therefore, a high speed detecting device and a circuit are required for an appropriate detection of the changes in the reflected light.

SUMMARY OF THE INVENTION

Accordingly, one object of this invention is to provide a novel optical information recording method and an apparatus that are capable of a controlled forming of an appropriate recording-mark by compensating for deviations from optimum recording caused by variation in irradiation power from the light source, a tilt of a recording medium, and/or variation of the recording medium regardless of a recording medium, a recording method, or a range of recording velocity. The present invention compensates for these deviations by detecting the state of a mark being formed.

One embodiment of the optical information recording method includes steps of modulating the irradiation light according to the information for recording, such steps comprising forming a recorded-mark on the recording medium by changing power of the irradiation light between a recording power and a not-recording power, receiving reflection light from the irradiation light reflected by the recording medium, converting the received reflection light into a received light signal, determining a state of the recorded-mark based upon the received light signal of the reflection light which is received during a predetermined period of time immediately after the irradiation power changes to the non-recording power, and controlling the recording power of the irradiation light according to the state of the recorded-mark.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
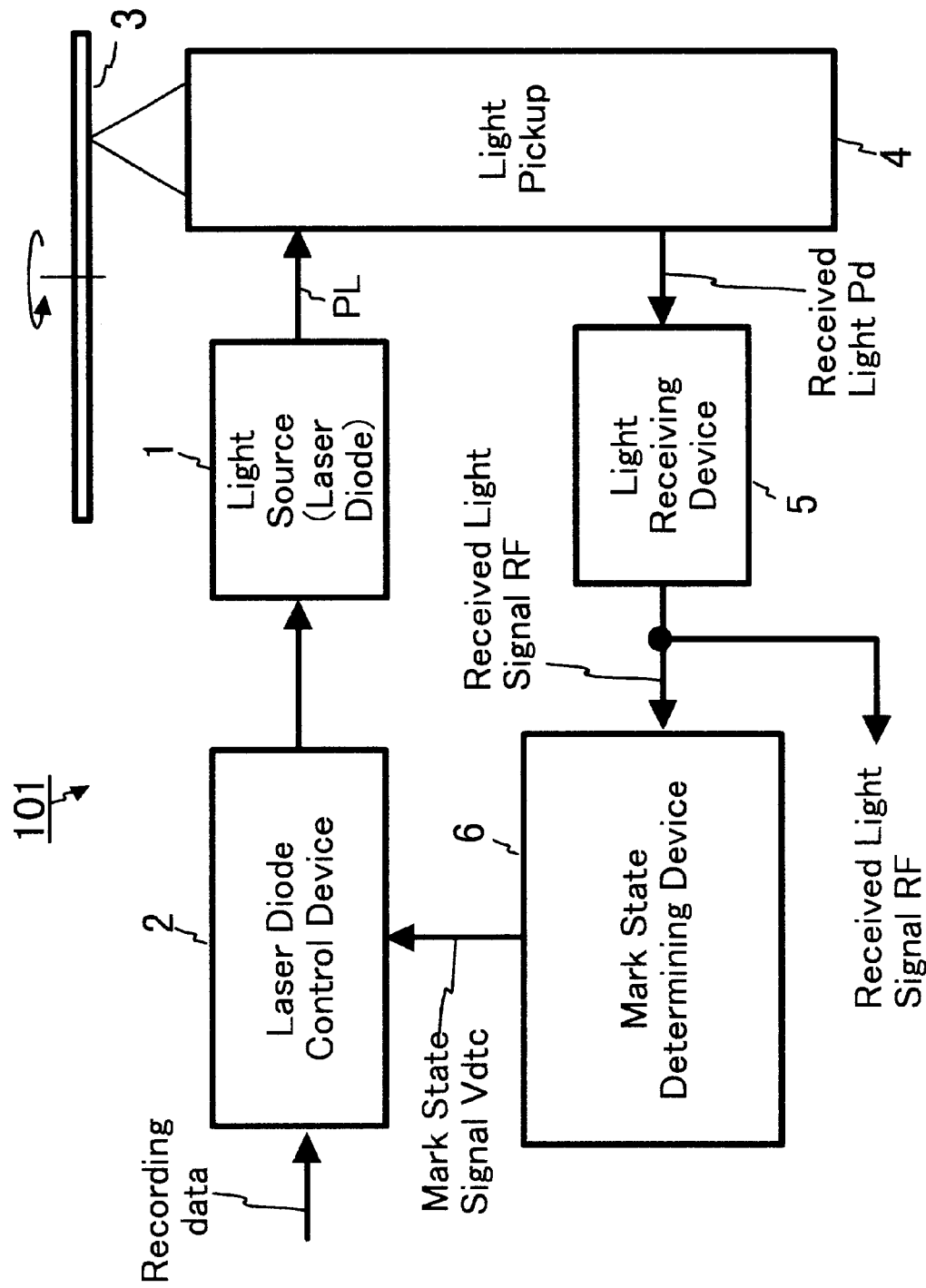
FIG. 1 is a functional block diagram illustrating an exemplary construction of an optical information recording apparatus according to an embodiment of the present invention.

Referring now to the drawings, wherein like reference numerals designate identical or corresponding parts throughout the several views, and more particularly to FIG. 1 thereof, FIG. 1 is a block diagram illustrating an optical information recording apparatus 101 according to an embodiment of the present invention. Referring to FIG. 1, the optical information recording apparatus 101 includes a laser diode 1, a laser diode control device 2, a recording medium 3, a light pickup 4, a light-receiving device 5, and a mark-state determining device 6. The laser diode 1 is a light source to irradiate the recording medium 3 for recording a mark as data thereupon and reading the mark as the data therefrom. The laser diode control device 2 controls the laser diode 1 to modulate the output power thereof according to recording data.

The light-pickup 4 includes an object lens to focus the irradiation light PL emitted by the laser diode 1 onto the recording medium 3 and to collect light reflected by the recording medium 3. The recording medium 3 has a recording layer that is recordable by a photon-mode reaction or a heat-mode reaction by the irradiation laser diode 1. The light receiving device 5 includes a photoelectric converter that receives reflected light Pd of the irradiation light PL, which is reflected by the recording medium 3, through the light-pickup 4, and then converts the received light into a received light signal RF. The mark-state determining device 6 determines a state of a recorded-mark based upon the received light signal RF after the output power of the laser diode 1 transits to a "pedestal power" Pp from a recording-power Pw before the next mark recording operation. Hereinafter, the term "pedestal power" is referred to as output power of the laser diode 1 that does not form any recorded-marks. The "pedestal power" Pp can be equal to bottom-power in a multiple-pulse recording method. The "pedestal power" Pp can be equal to reading-power, or can be smaller than the reading-power but greater than zero, or greater than the reading-power but smaller than the recording-power Pw. The term "recording-power" is referred to as output power of the laser diode 1 that can form recorded-marks.

The mark-state determining device 6 generates a mark-state signal Vdtc according to the state of a recorded-mark, and then sends the mark-state signal Vdtc to the laser diode control device 2 as a feedback signal for the recording-power Pw. The laser diode control device 2 determines a deviation of the recording-power Pw from an optimum recording-power for the moment of recording the mark producing the mark-state signal Vdtc, and then controls the output power of the laser diode 1 such that the recording-power Pw becomes the optimum recording-power.

The optical information recording apparatus 101 further includes a servo control device (not shown) that controls the light-pickup 4 to place a light spot LSP irradiating the recording medium 3 at any given places thereof, and others.

Figure 2:
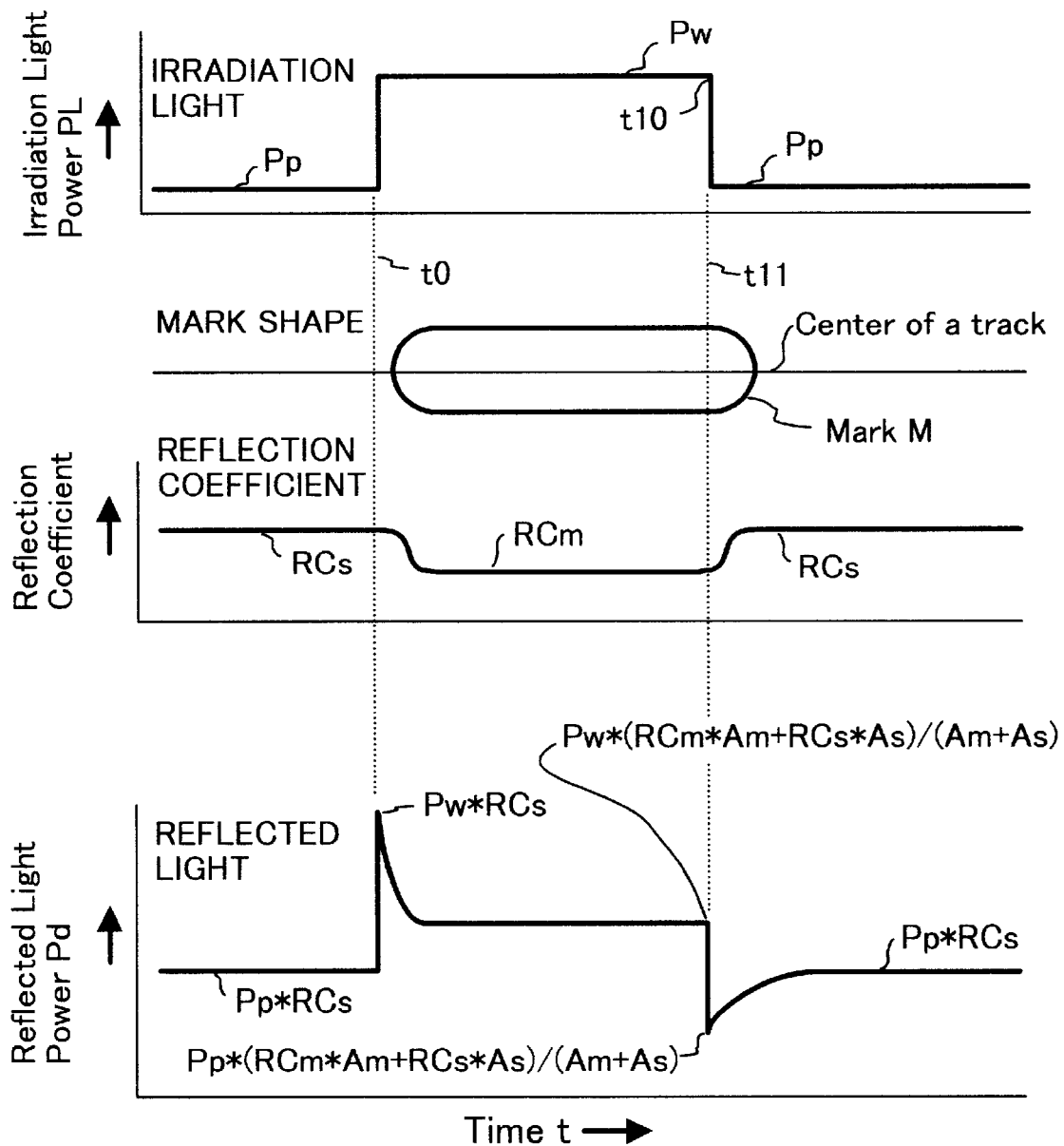
FIG. 2 is a graph illustrating a relation among irradiation light, a recorded-mark shape, a reflection coefficient, and reflected light power.

FIG. 2 illustrates a relation among irradiation light, a recorded-mark shape, a reflection coefficient, and reflected light power. In FIG. 2, "IRRADIATION LIGHT PL" indicates a waveform of a irradiation light of the laser diode 1, "MARK SHAPE" indicates a shape of a recorded-mark M on the recording medium 3 formed by the irradiation light PL, "REFLECTION COEFFICIENT" indicates a waveform of a reflection coefficient of the recording medium 3 having the recorded-mark M, and "REFLECTED LIGHT Pd" indicates a waveform of reflected light reflected by the recording medium 3. In the illustration of "IRRADIATION LIGHT PL", Pw indicates the "recording-power" and Pp indicates the "pedestal power". Time t0 and time t10 indicate a start and an end of the recording-power Pw respectively, and time t11 indicates a start of the pedestal power Pp. The time t10 and the time t11 can be practically the same time. The pedestal power Pp is smaller than the recording-power Pw so as not to form any recording marks and can be for example, substantially the same as the reading-power.

Under these conditions, the irradiation light PL of the laser diode 1 irradiates the recording medium 3 through the light pickup 4. The recording medium 3 is kept rotating such that a light spot LSP, which is emitted by the laser diode 1 and which is focused by the light pickup 4, moves relative to the medium 3 at a substantially constant linear velocity at all irradiated places. The recording medium 3 can be rotated in a constant angular velocity, which is called as a "CAV method"; however, even in the CAV method, a linear velocity at a certain radial location is still constant. Therefore, the light spot LSP moves relative to the medium 3 at a constant velocity on a recording track of the recording medium 3.

Accordingly, the light spot LSP with the recording-power Pw forms a recorded-mark M as shown as "mark M" in FIG. 2. That is, when a recorded-mark M is formed by irradiation heat of the laser diode 1, because of a photochemical reaction time and/or a heat capacity of the recording medium 3, the "mark M" will not be formed instantly when the irradiation with the recording-power Pw starts. In other words, the formation of the "mark M" does not start at the time t0 when the recording-power Pw starts to irradiate but starts a certain time after the time t0 as shown in FIG. 2. The end of the "mark M" can be delayed from the end of the irradiation of the light spot LSP with the recording-power Pw due to the photochemical reaction time and/or the heat capacity of the recording medium 3 as well. The width of the "mark M" perpendicular to the locus is smaller than the diameter of the light spot LSP in the embodiment. On the other hand, an area where the recorded-mark M is not formed is referred to as "space".

Referring to "REFLECTION COEFFICIENT" in FIG. 2, RCs and RCm indicate reflection coefficients of the "space" and "mark" respectively. A reflection coefficient of the "mark" is smaller than that of the "space" in the embodiment. A reflection coefficient in the boundary between the "space" and the "mark" can be between of RCm and RCs. Referring to REFLECTED LIGHT Pd in FIG. 2, the reflected light power Pd is approximated as the product of the irradiation light PL of the laser diode 1 and the reflection coefficient of a part of the recording medium 3, which is covered by the light spot LSP.

In FIG. 2, before reaching the time t0, the irradiation light PL has the power Pp, and the light spot LSP of the irradiation light PL covers only "space". Consequently, the product of the irradiation light PL and the reflection coefficient, i.e., the reflected light power Pd, is Pp×Rcs. At the time t0, the irradiation light PL is changed to Pw, however, the light spot LSP of the irradiation light PL covers only the "space" area, because the mark has not yet formed at the moment, and consequently, the reflected light power Pd becomes Pw×Rcs. Immediateluy after the time t0, the "mark M" is formed, and the light spot LSP of the irradiation light PL cover both "mark M" and "". And consequently, the reflected light power Pd becomes smaller than Pw×RCs and is gradually decreased. At the time t10, the irradiation light PL is not yet changed to Pp and the light spot LSP of the irradiation light PL covers both "mark M" area (referred to as "Am") and "space" area (referred to as "As"), and consequently, the reflected light power Pd becomes Pw×(RCm×Am+RCs× As)/(Am+As). At the time t11, when the recording power Pw changes to the pedestal power Pp, the light spot LSP of the irradiation light PL covers substantially the same areas at the time t10; consequently, the reflected light power Pd is Pp×(RCm×Am+RCs×As)/(Am+As). After the time t11, the reflected light power Pd gradually approaches to Pp×RCs.

Figure 3:
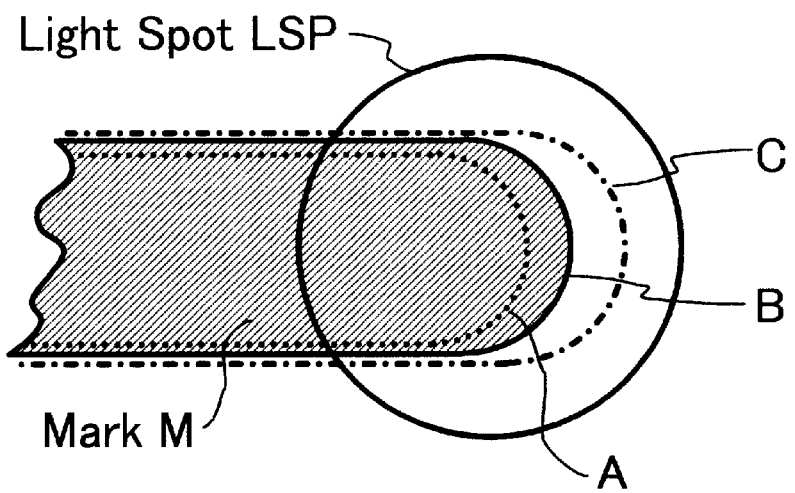
FIG. 3 illustrates a relation between a light spot of irradiation light and recorded-marks.

FIG. 3 illustrates a relation between a light spot size of irradiation light and a recorded-mark at the vicinity of the trailing end of a recorded mark at the time t10 or t11 in FIG. 2. In FIG. 3, a doted line "A" illustrates a mark formed with recording-power Pwa that is smaller than an optimum recording-power. A line "B" illustrates a mark formed with the optimum recording-power Pwb. A doted line "C" illustrates a mark formed with recording-power Pwc that is larger than the optimum recording-power. A deviation from the optimum recording-mark is caused by not only the deviation of the recording-power from the optimum recording-power, but also by other reasons, such as, for example, sensitivity variation of the recording medium 3, a tilt of the recording medium 3 relative to the laser light, a defocused light spot of the irradiation light PL, and so on. The tilt of the recording medium 3 and the defocused light spot deform the light spot LSP, and thereby the resulting recorded-mark becomes different from the one resulting from an ideal light spot shape. The deviation of the recording-power from the optimum recording-power Pwb can be caused, for example, by a setting error for a control target or an output power drift of the laser diode 1 due to a temperature change.

Figure 4:
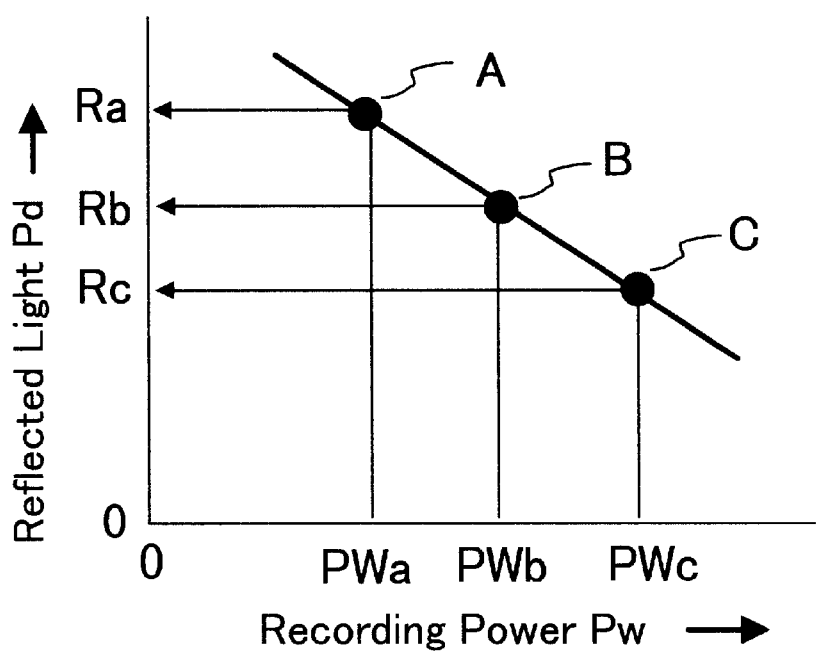
FIG. 4 is a plot illustrating a relation between recording-power and reflected light by a mark recorded on a recording medium.

FIG. 4 is a plot illustrating a relation between recording-power and power of light reflected by a mark recorded on a recording medium. The reflection coefficient of the recorded-mark M is smaller than that of the "space" in the embodiment. And when the light spot LSP covers both a part of the "mark M" and the "space", the power of the light reflected by an area that is irradiated by the light spot LSP is approximately inversely proportional to that of the light reflected by the part of the recorded mark M. Accordingly, at time t11 (FIG. 2), the reflected light power Pd of the light spot LSP is approximately inversely proportional to that of the light reflected by the part of the recorded-mark M, i.e., the reflected light Pd is approximately inversely proportional to the recording power Pw as shown in FIG. 4. In FIG. 4, when recording power is Pwa, the light forms a "mark M" shown as "A" in FIG. 3, and the recorded mark reflects light with intensity Ra at time t11. Likewise, when recording power is Pwb, the recorded mark reflects light with intensity Rb. And when recording power is Pwc, the recorded mark reflects light with intensity Rc.

Figure 5:
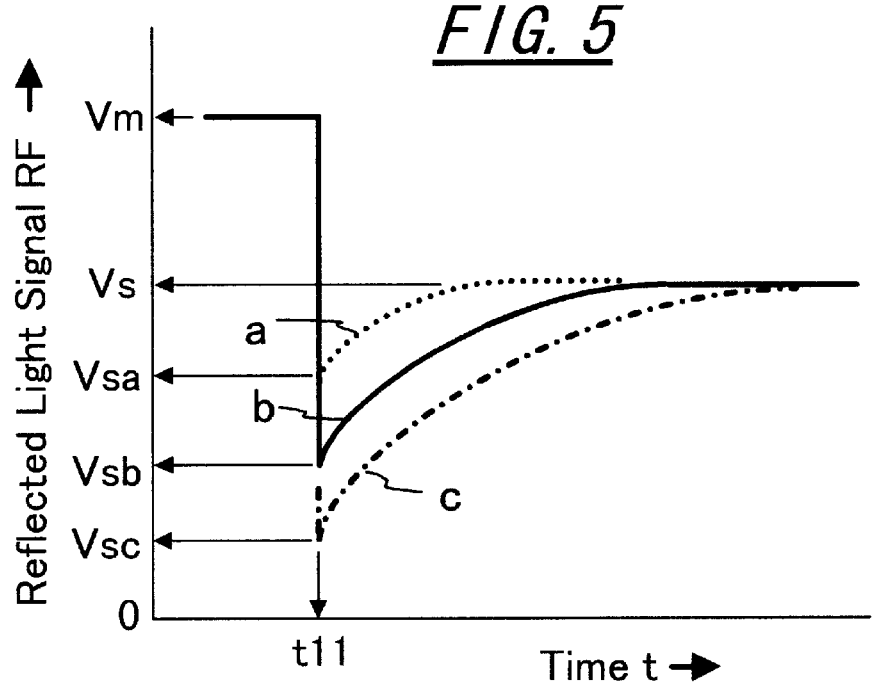
FIG. 5 is a graph illustrating waveforms of reflected light signal RF in a vicinity when a laser diode switched to output a pedestal power as a function of time for comparison to a state of a recorded-mark.

FIG. 5 is a graph illustrating waveforms of a reflected light signal RF, which is converted from the reflected light Pd by the light-receiving device 5, in the vicinity where the laser diode 1 switches to output the pedestal power Pp. In FIG. 5, a waveform "a" indicates a reflected light signal RF by a mark M formed like "A" in FIG. 3 with recording light Pwa. Likewise, the waveform "b" indicates a reflected light signal RF by a mark M formed like "B" in FIG. 3 with the recording light Pwb, and the waveform "c" indicates a reflected light signal RF by a mark M formed like "C" in FIG. 3 with the recording light Pwc. As these waveforms show, the waveform of a reflected light signal RF changes according to the shape of "the mark M". Therefore, the state of a recorded mark can be determined based upon the detected result of the reflected light signal RF.

The reflected light signal RF is proportional to the product of the irradiation light PL and an area of "space". The mark area covered by the light spot LSP gradually approaches zero, or the space area covered by the light spot LSP gradually approaches whole the light spot LSP. Consequently, the waveforms of "a, "b", and "c" converge at a constant value Vs, which is approximately the same as the product of the irradiation light PL of the laser diode 1 and the reflection coefficient of the recording medium 3.

Figure 6:
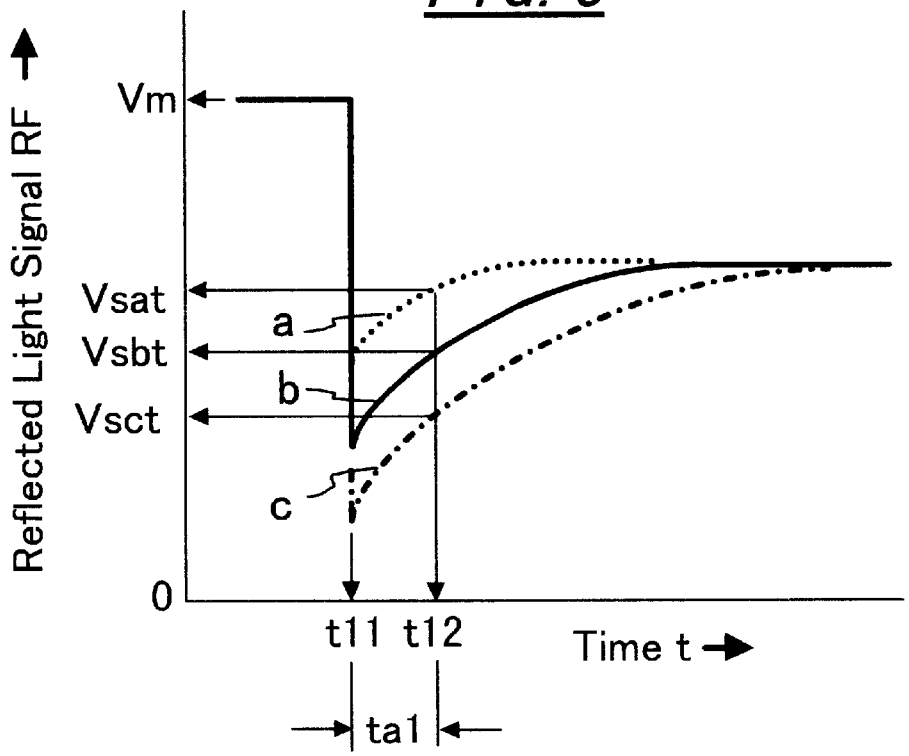
FIG. 6 is the same waveforms of FIG. 5 illustrating differences among the reflected light signals RF at a certain time tat from the laser diode 1 starts outputting the pedestal power.

FIG. 6 is a graph of waveforms of FIG. 5 illustrating differences among the reflected light signals RF at time after ta1 from t11. In FIG. 6, the laser diode 1 starts outputting the pedestal power Pd at time t11. "t12" represents a time whereta1 is elapsed from t11. "Vsat" represents a reflected light signal RF at t12 when a mark M is formed like "A" shown in FIG. 3. Likewise, "Vsbt" represents a reflected light signal RF at t12 when a mark M is formed like "B" ; "Vsct" represents a reflected light signal RF at tl2 when a mark M is formed like "C". Thus, the state of a recorded-mark can also be detected by using differences in the reflected light signal RF at a certain time after the laser diode 1 starts outputting the pedestal power Pp.

Figure 7:
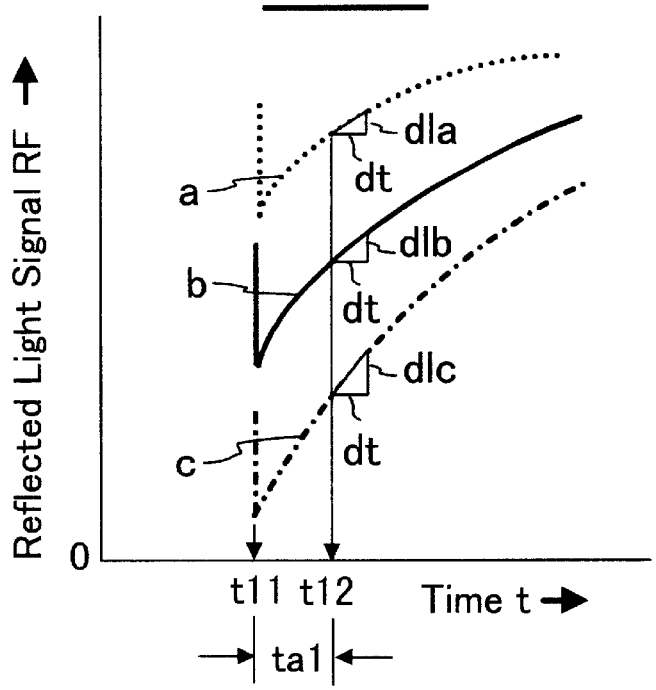
FIG. 7 is a magnified graph of the waveforms of FIG. 5 in a vicinity of time elapsed ta1 from the laser diode 1 starts outputting the pedestal power, illustrating gradient differences of reflected light signal RF depending upon the state of a recorded-mark.

FIG. 7 is a magnified graph of the waveforms of FIG. 5, in the vicinity of time t12 whereta1 is elapsed from t11, illustrating a gradient of each reflected light signal RF. "t12" indicates a time whereta1 is elapsed from t11, "dt" indicates a short time, "dla", "dlb", and "dlc" indicate a change in each of the reflected light signals RF. Thereby, each dla/dt, dlb/dt, and dlc/dt represents a gradient of the graphs at t12. The gradient depends upon the state of a recorded mark. In this embodiment, the gradient dla/dt is the smallest and the gradient dlc/dt is the greatest among the three. Accordingly, the state of a recorded mark can also be determined according to the gradients. The time derivative of the waveform of a reflected light signal RF at t12 can be used, instead of the gradient, as well, for determining the state of a recorded-mark.

Figure 8:
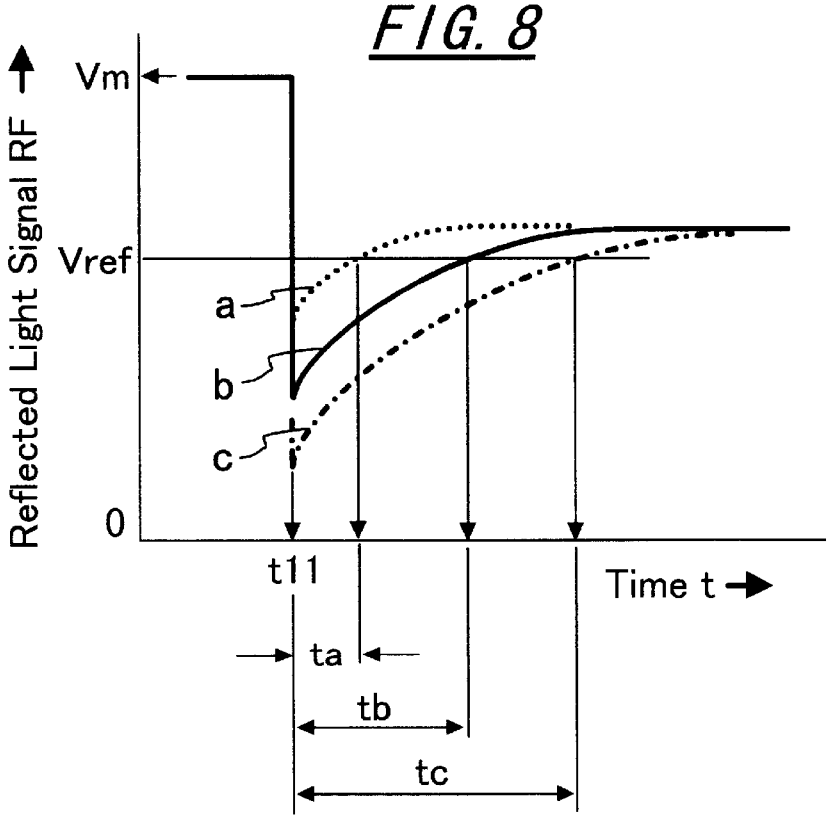
FIG. 8 is the same waveforms of FIG. 5 illustrating time differences from the laser diode 1 starts outputting the pedestal power to the reflected light signal RF becomes a certain value depending upon the state of a recorded-mark.

FIG. 8 is a graph of the waveforms of FIG. 5, illustrating time differences from a time when the laser diode 1 starts outputting the pedestal power Pp to a time when the reflected light signal RF becomes a certain value for each of the recorded mark A, B, and C of FIG. 3. "Vref" indicates a reference value or a threshold value of the reflected light signal RF. ta, tb, and tc respectively indicate a periods of time from t11 to the time when the reflected light signal RF reaches the value Vr. The period depends upon the state of a recorded-mark. For example, the period is approximately proportional to the size of a recorded-mark M. In this embodiment, ta is the smallest, and tc is the greatest among the three. Accordingly, the state of a recorded-mark can also be determined according to these periods.

Figure 9:
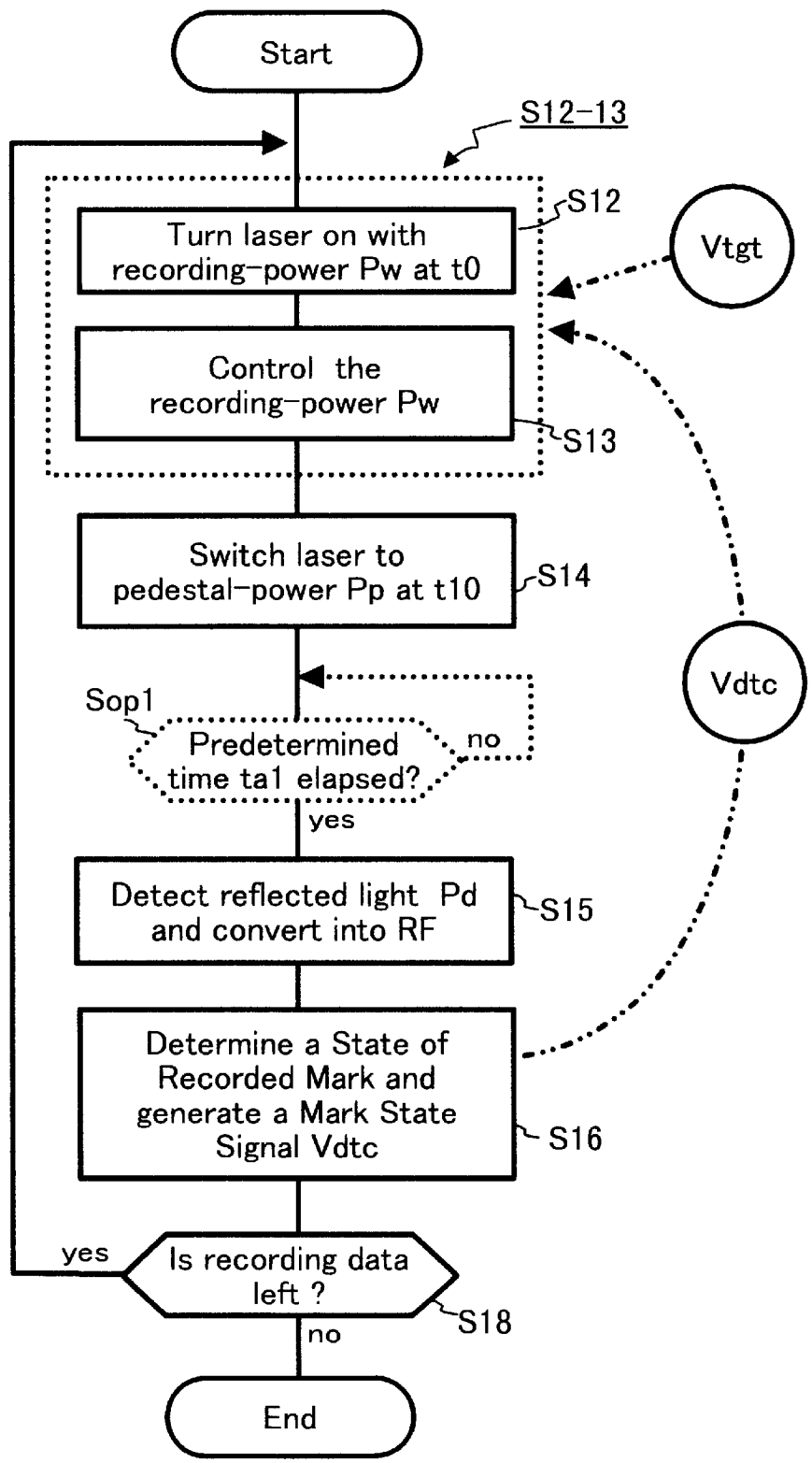
FIG. 9 is a flowchart illustrating the steps in a method for controlling a recording-power of the embodiment.

FIG. 9 is a flowchart illustrating exemplary steps of an operation for controlling the recording-power according to an embodiment of the present invention. The control steps are executed for each operation of forming a recorded-mark or at a predetermined interval of the operation of forming a recorded-mark. Reference symbol Vtgt represents a control target for the mark-state signal Vdtc. The step S12 and step S13 are referred to as S12–13. In the step S12, the laser diode 1 starts irradiation with recording-power Pw to the recording medium 3 at time t0 of FIG. 2, and formation of a recorded-mark M is started. During the step S12–13, the laser diode control device 2 controls the laser diode 1 to output a proper irradiation light to form a recorded-mark such that a mark state signal Vdtc obtained from a reflected light from the recording medium coincides to a control target Vtgt, utilizing a previously obtained mark-state signal Vdtc. In other words, when the mark-state signal Vdtc, which has been obtained with a mark M formed in a previous recording operation, is too large or too small relative to the control target Vtgt, the laser diode control device 2 controls the laser diode 1 to emit proper irradiation light according to the difference between the control target Vtgt and the mark-state signal Vdtc.

In the step S14, at time t10 of FIG. 2, the laser diode control device 2 switches the irradiation power of the laser diode 1 from the recording-power Pw to the pedestal power Pp. At this moment, the formation of a recorded-mark M is completed, and the recorded-mark M is formed as "Mark M" in FIG. 2.

Step Sop1 is a timer and is optional. When the Step Sop1 is executed, a detecting operation in step S15 is executed time ta1 after time t10.

In step S15, if the step Sop1 is executed at time t12 of FIG. 6 or FIG. 7, or, at time t11 of FIG. 2 which is substantially the same as time t10, the light-receiving device 5 receives reflected light Pd from the recording medium 3 and converts the received light Pd into a received light signal RF. When the step Sop1 was executed, the received light signal RF such as "Vsb" of FIG. 5 is obtained. When the step Sop1 was not executed, the received light signal RF such as "Vsbt" of FIG. 6 is obtained.

In step S16, the mark-state determining device 6 determines the state of the recorded-mark according to the received light signal RF and generates a mark-state signal Vdtc as a feedback signal for a next recording mark formation. The mark-state determining device 6 sends the mark-state signal Vdtc as the state of the recorded-mark to the laser diode control device 2 for the next recording mark formation. The mark-state determining device 6 can use, in addition to the received light signal RF, various information to determine the state of a recorded-mark. For example, a recording velocity, data of the material of the recording medium 3, such as the sensitivity data, the standard reflection coefficients of the "mark" and the "space", temperature in the recording apparatus 101, and so forth, can be used. In step S18, if any recording data is left, the operation returns to step S12.

Figure 10:
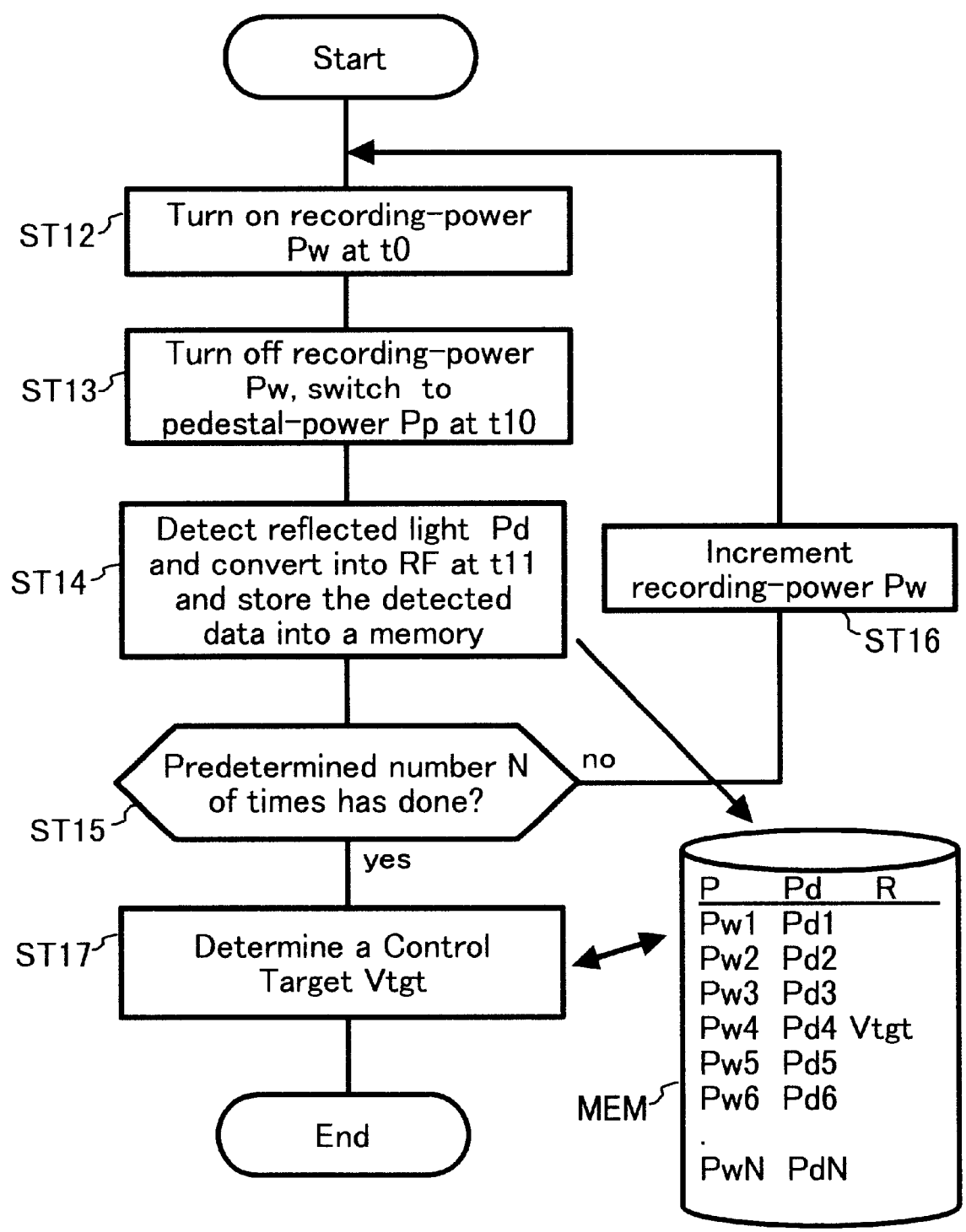
FIG. 10 is a flowchart of a test writing illustrating the steps in a method to determine a control target for acquiring a desired recorded-mark.

FIG. 10 is a flowchart of an exemplary test writing operation, illustrating steps for determining a control target Vtgt. The test writing can be executed, for example, when the optical information recording apparatus 101 is turned-on or connected to a host computer, when the recording apparatus 101 receives a command from the computer, when a new recording media disk is inserted to the recording apparatus 101, when temperature inside the recording apparatus 101 is changed. Or test writing can be executed at a predetermined interval, and so forth. The test writing can be done using a predetermined area of the recording media desk 3, such as, a part of the outer or inner regions thereof.

In step ST12, the laser diode 1 starts irradiation with initial recording-power Pw to the recording medium 3 at time t0 of FIG. 2. In step ST13, at time t10 of FIG. 2, the laser diode control device 2 switches the irradiation power of the laser diode 1 to the pedestal power Pp from the recording-power Pw. In step ST14, at time t11 of FIG. 2, the light-receiving device 5 receives reflected light Pd from the recording medium 3 and converts the received light Pd into a received light signal RF. Then, a pair of the received light signal RF data and the recording-power Pw data is stored in a memory MEM, provided, for example, inside the mark-state determining device 6. The above operation of obtaining the received light signal RF and storing the pair of the received light signal RF data and the recording-power Pw data can be executed at time afterta1 from t11, shown as t12, in FIG. 6 or FIG. 7.

A path from the step ST12 through the step ST15 is repeated a predetermined number of times N with changing the recording-power Pw. In the step ST15, whether the predetermined number of times N of the path is completed is judged. If the predetermined number of times N of the path is not completed, the operation goes to step ST16. In step ST16, the recording-power Pw is incremented by a predetermined value. If the predetermined number N of times of forming and detecting the marks is completed, N pair of the received light signal RF data and the recording-power Pw data are stored in the memory MEM.

In step ST17, those pairs of the data are evaluated from the viewpoint of, for example, deviations of length of both a recorded short mark and a recorded long mark from specified length according to a specific recording format, and then a pair of the received light signal RF data and the recording-power Pw data, which recorded the recorded-marks with minimum deviation from the specification, is chosen as the control target "Vtgt".

Figure 11:
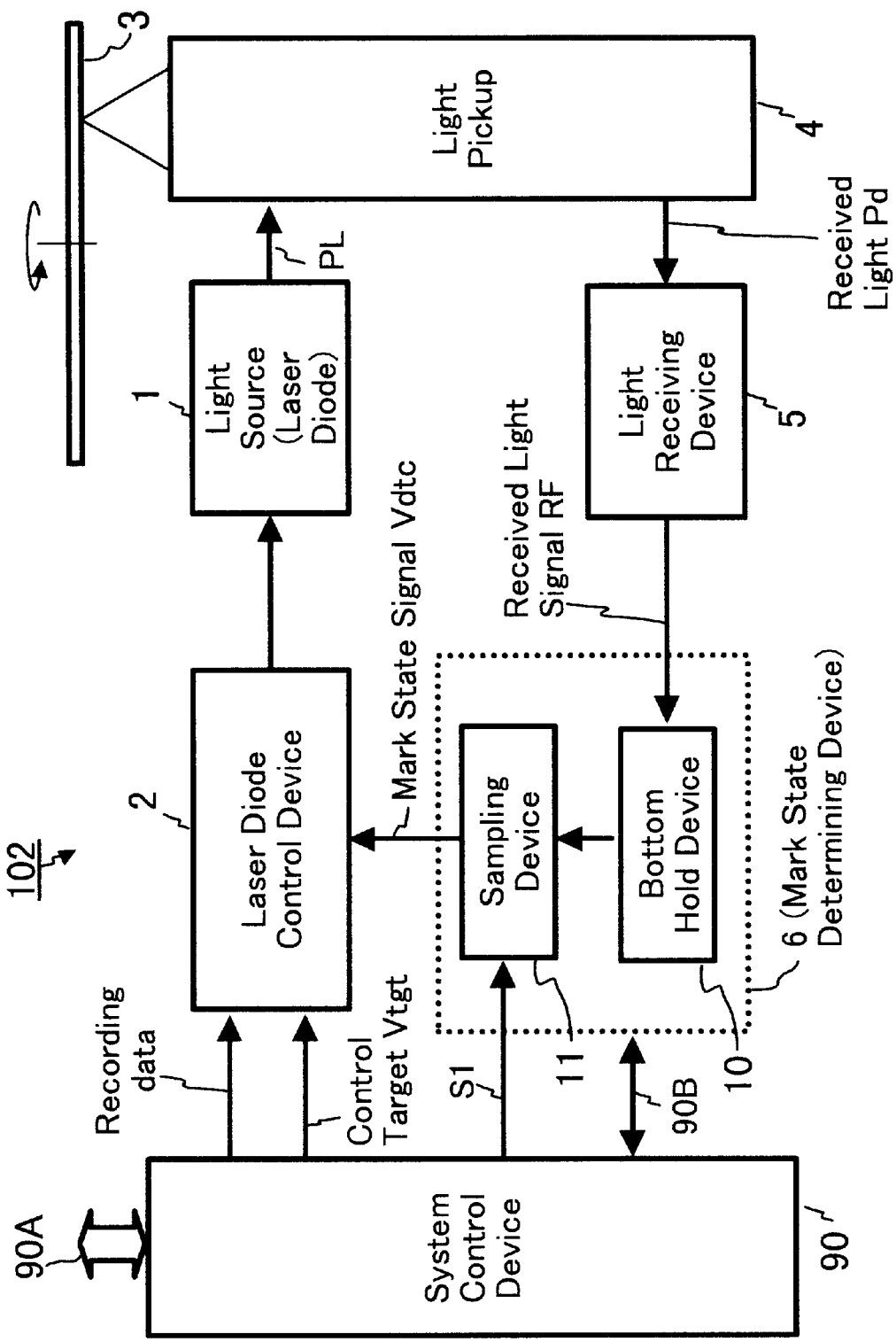
FIG. 11 is a functional block diagram illustrating an optical information recording apparatus according to another embodiment of the present invention.

FIG. 11 is a functional block diagram illustrating an optical information recording apparatus 102 according to another embodiment of the present invention. In FIG. 11, functional blocks that are substantially the same as those in FIG. 1 are denoted by the same reference numerals. The optical information recording apparatus 102 includes a system control device 90. The system control device 90 can be, for example, a micro computer system having a CPU, a RAM, a ROM, a non-volatile memory, an input output device, a host computer interface 90A, an external bus 90B, and so forth.

The mark-state determining device 6 includes a bottom-hold device 10 and a sampling device 11. The bottom-hold device (i.e. a minimum value storing device) 10 is a circuit to detect and hold a bottom or a minimum value of received light signals RF that are output from the light-receiving device 5. The sampling device samples or retrieves the bottom value of received light signal RF held by the bottom-hold device 10 and converts the sampled signal into digital data by a built-in analog to digital converter.

Figure 12:
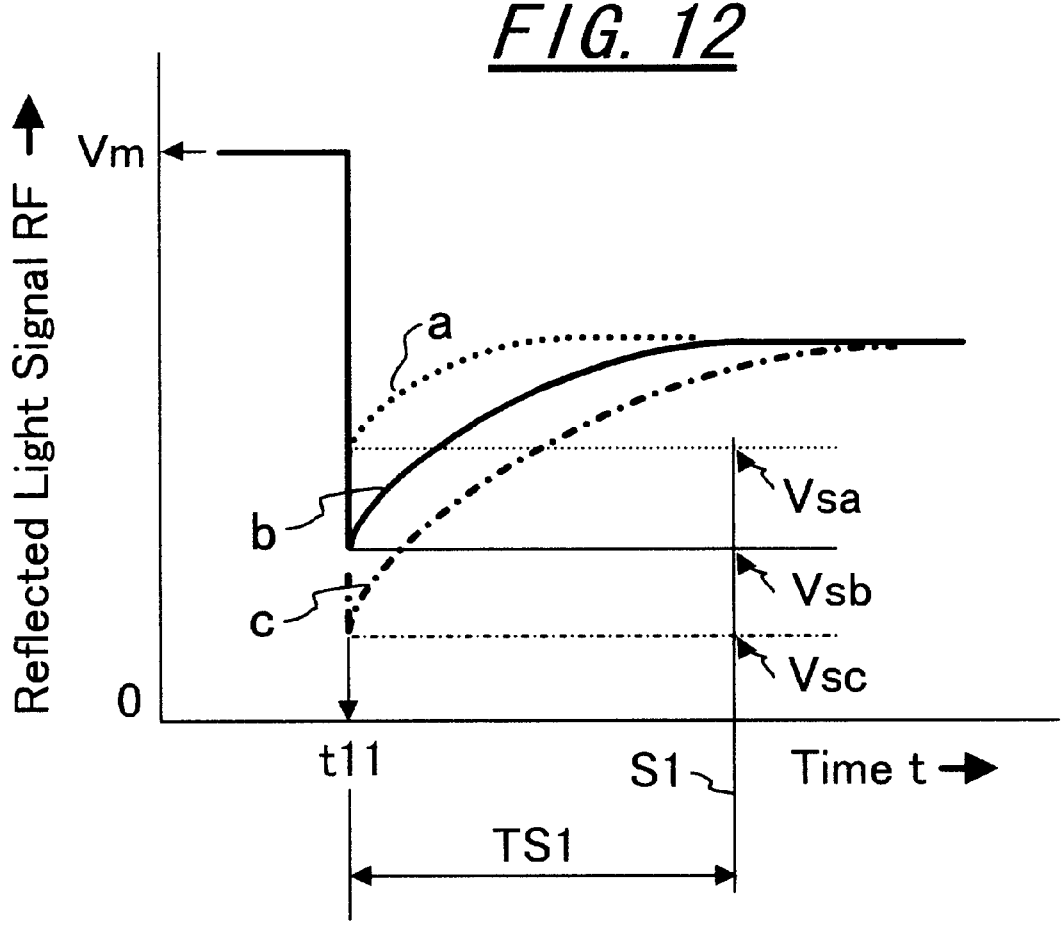
FIG. 12 is a graph illustrating waveforms of reflected light signal RF of the functional block diagram of FIG. 11.

FIG. 12 is a graph illustrating waveforms of reflected light signal RF output from the light receiving device 5 and input to the mark-state determining device 6 in the functional block diagram of FIG. 11. Referring FIG. 12, "a", "b", and "c" are waveforms of reflected light signals RF, each representing a state of a recorded-mark. The bottom-hold device 10 becomes ready to hold a bottom value of received light signal RF before the received light signal RF is output, i.e., before the time t11. And thereby at the time t11, the bottom-hold device 10 holds the signal RF and outputs the held signal, such as the one shown as Vsa, Vsb, or Vsc, depending upon the state of a mark, such as "A", "B", or "C" of FIG. 3. At time after TS1 from t11, the sampling device 11 retrieves the held bottom value of the received light signal RF and converts the held signal into digital data Vdtc, and sends the data Vdtc as feedback data of the state of a recorded-mark to the laser diode control device 2.

The laser diode control device 2 controls the laser diode 1 according to the received mark-state signal Vdtc to emit proper irradiation light to form a recorded-mark such that a mark-state signal Vdtc of the next recording mark coincide with the control target Vtgt. The mark-state determining device 6 can also use another information to determine the state of a recorded-mark, such as, recording velocity data and material characteristics data of the recording medium 3, which are stored in the system control device 90.

Figure 13:
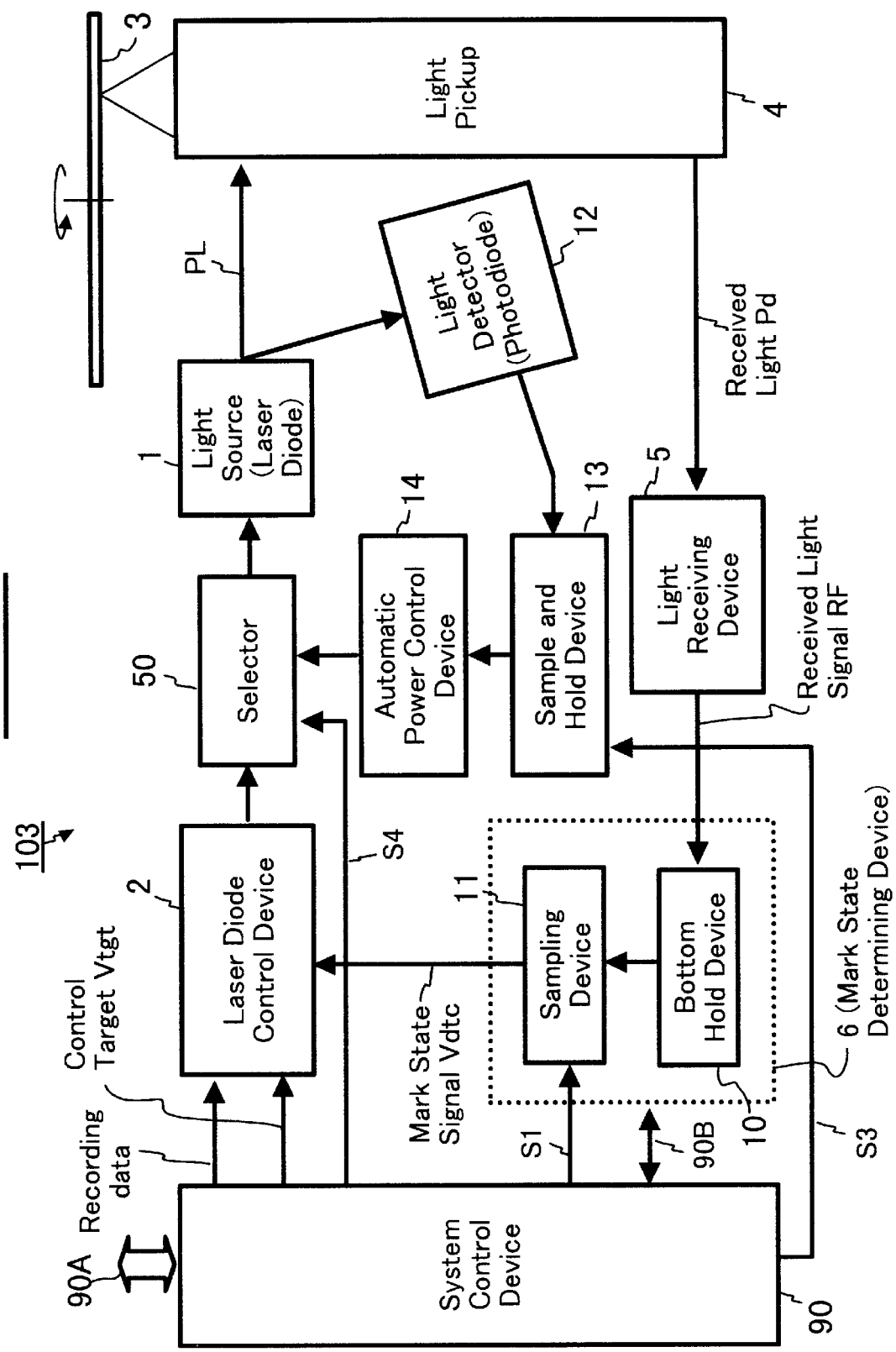
FIG. 13 is a functional block diagram illustrating an optical information recording apparatus according to still another embodiment of the present invention.

FIG. 13 is a functional block diagram illustrating an optical information recording apparatus 103 according to still another embodiment of the present invention. In this embodiment, the recording power is controlled in substantially the same manner as in the embodiment shown in FIG. 11. However, the pedestal power Pp is controlled by an automatic power control (APC) system for compensating, for example, a temperature drift of the laser diode 1. The APC system stabilizes the pedestal power Pp of the laser diode 1, and as a result, detection of a light reflected by a recorded-mark M and the generation of a mark-state signal Vdtc are not affected by the temperature drift of the laser diode 1. Consequently, controlling accuracy of the recording power Pw is further improved. The APC system monitors only a part of radiation of the laser diode 1. Further, the APC system only controls the pedestal power Pp thereof. Therefore, the APC system requires neither a high speed nor a high drive current as the recording power Pw. Consequently, the APC system in the embodiment can be constructed with a reasonably low fabrication cost.

Referring to FIG. 13, the optical information recording apparatus 103 includes, in addition to the devices of FIG. 11, a photodiode 12 as a light detector, a sample and hold device 13, an automatic power control (APC) device 14, and a selector 50. The photodiode 12 directly detects a part of light emitted from the laser diode 1 and sends detected signal into the sample and hold device 13. The sample and hold device 13 samples and holds the output from the photodiode 12 at a timing of a sampling signal S3, and sends the held signal into the APC device 14. The sampling signal S3 is generated by the system control device 90 at time t11 or after a predetermined time after t11 of FIG. 2. And thereby, the sample and hold device 13 samples and holds the input from the photodiode 12 while the laser diode 1 is emitting the pedestal power Pp radiation. The APC device 14 controls the laser diode 1 to emit a predetermined radiation level of the pedestal power Pp according to the sampled data sent from the sample and hold device 13.

Figure 14:
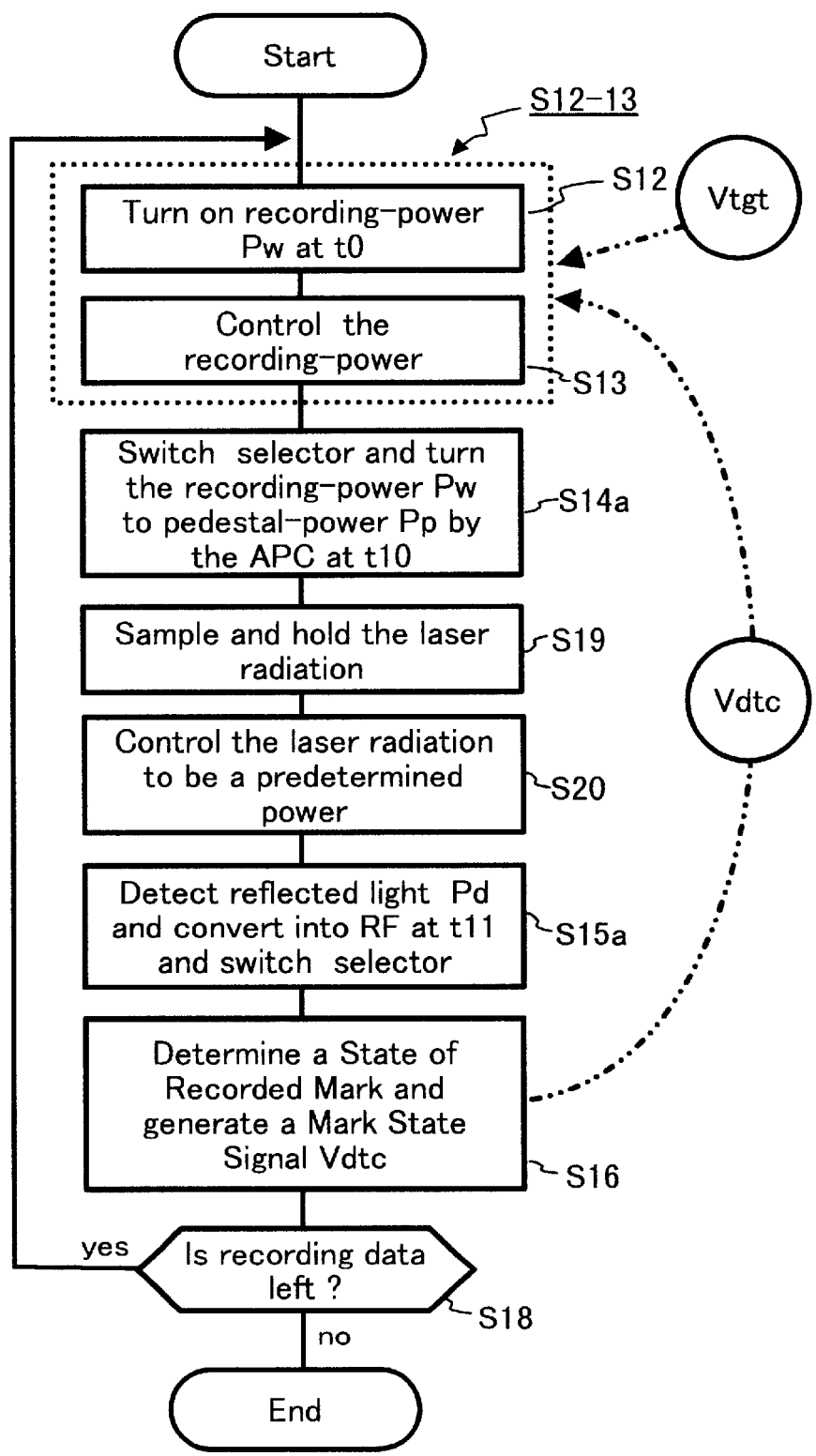
FIG. 14 is a flowchart illustrating the steps in a method for controlling the recording-power of the optical information recording apparatus of FIG. 13.

FIG. 14 is a flowchart illustrating an exemplary operation for controlling the recording-power of the optical information recording apparatus 103. In FIG. 14, the operations are substantially the same as those of FIG. 9 except steps S14a, S15a, S19, and S20. In the step S14a, at time t10 of FIG. 2, the selector 50 is switched to input a signal from the APC device 14. Thereby, the irradiation power of the laser diode 1 is switched to a predetermined pedestal power Pp controlled by the APC device 14 from the recording-power Pw controlled by the laser diode control device 2. At this moment, forming of a recorded-mark M is completed and the recorded-mark M is formed as shown as "Mark M" in FIG. 2. In the step S19, the sample and hold device 13 samples and holds the input signal from the photodiode 12 and sends the signal into the APC device 14. In the step S20, the APC device 14 controls the laser diode 1 to emit the predetermined radiation level of the pedestal power Pp according to the sampled signal.

In step S15a, after the above operation of step S20, the light-receiving device 5 receives reflected light Pd from the recording medium 3 and converts the received light Pd into a received light signal RF. After that, the selector 50 is again switched to input a signal from the laser diode control device 2.

Figure 15:
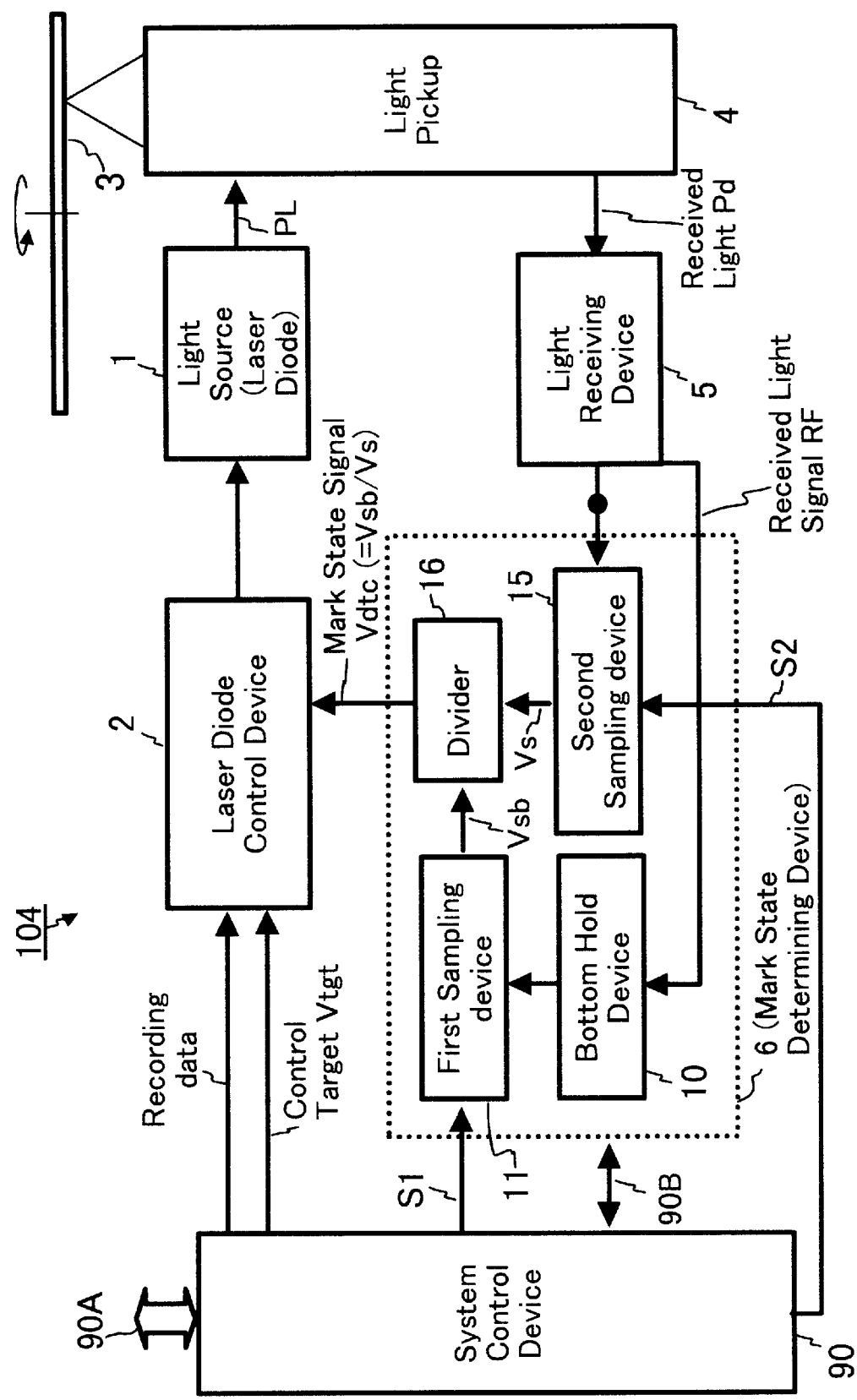
FIG. 15 is a functional block diagram illustrating an optical information recording apparatus according to still another embodiment of the present invention.
Figure 16:
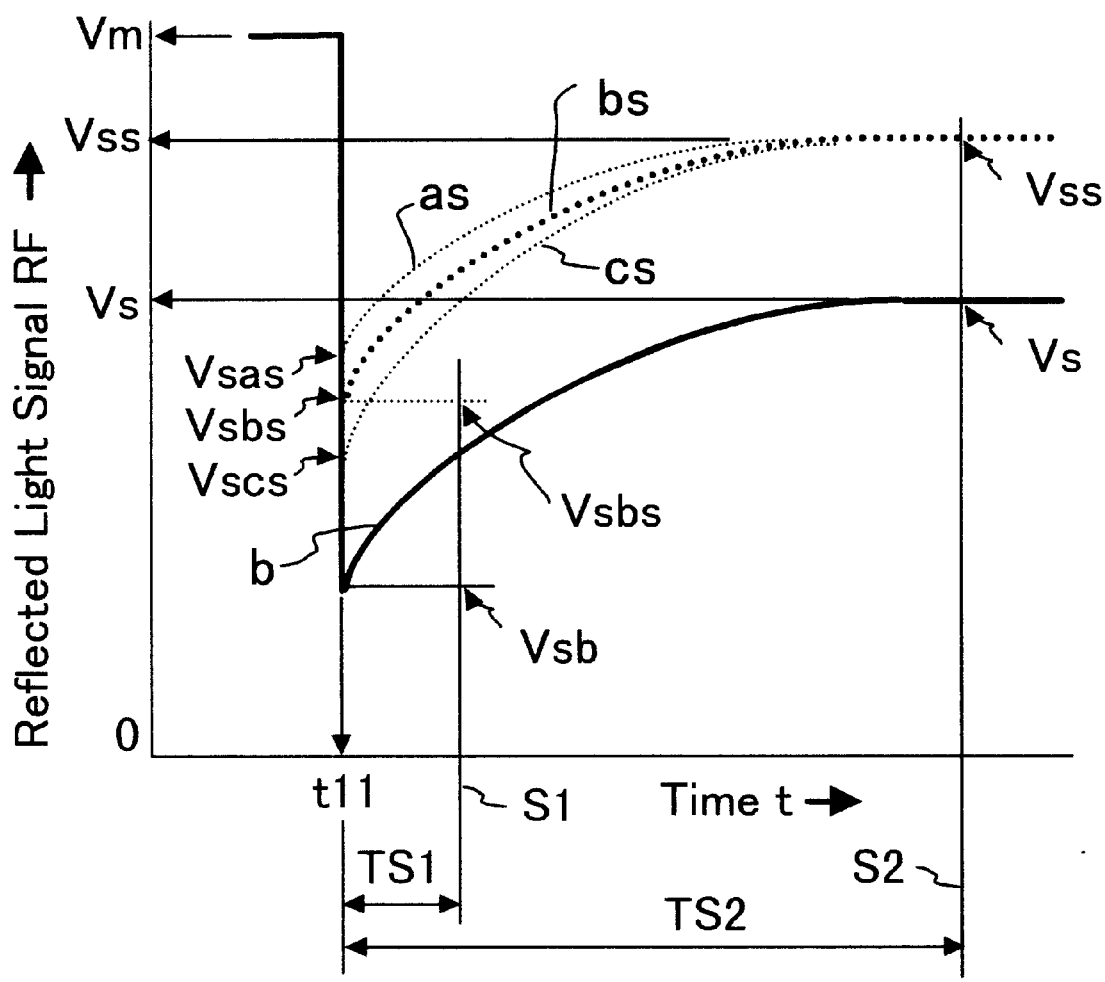
FIG. 16 is a graph illustrating waveforms of reflected light signal RF of the optical information recording apparatus of FIG. 15.
Figure 17:
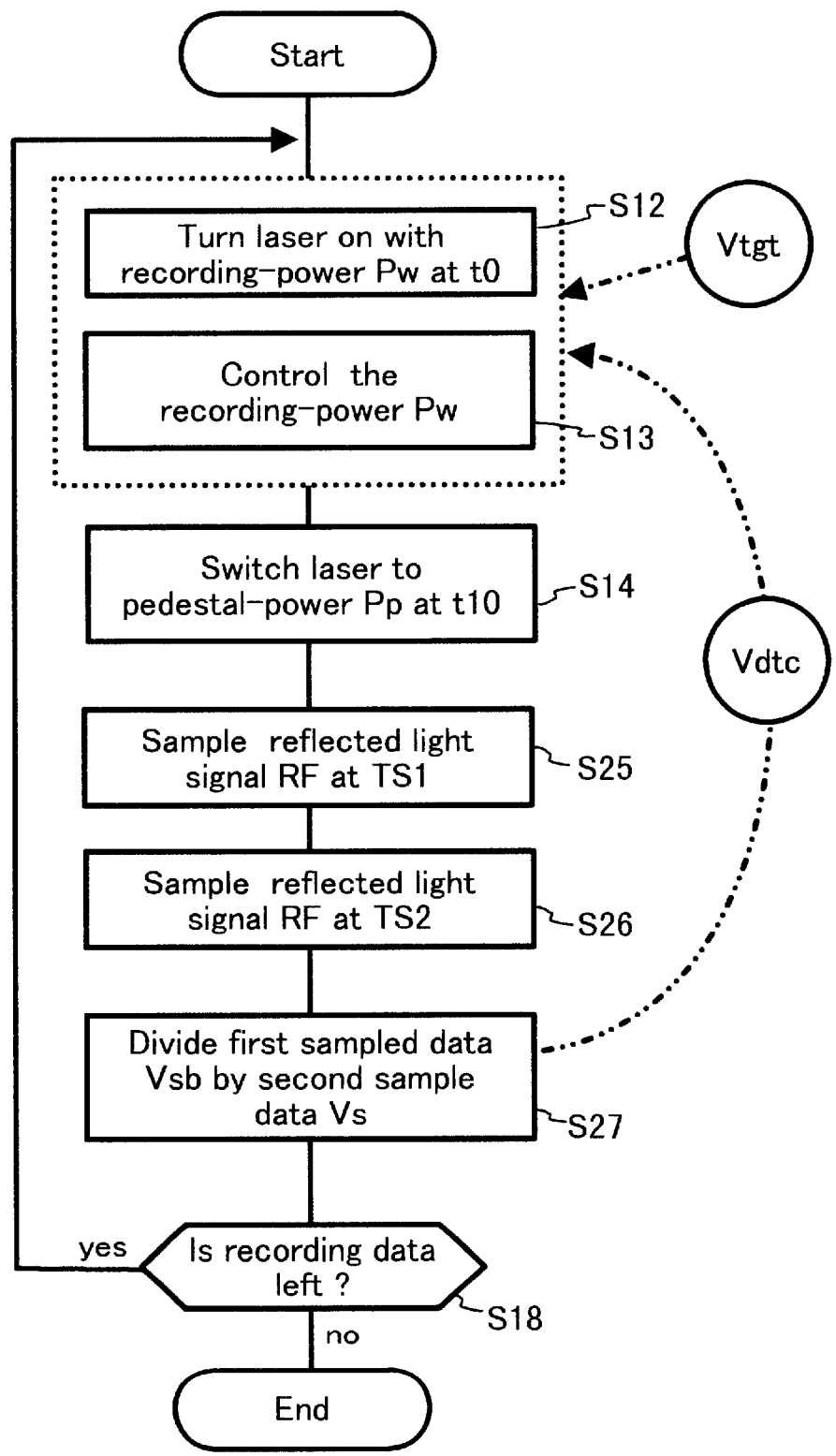
FIG. 17 is a flowchart illustrating the steps in a method for controlling the recording-power of the optical information recording apparatus of FIG. 15.

FIG. 15 is a functional block diagram illustrating an optical information recording apparatus 104 according to still another embodiment of the present invention. FIG. 16 is a graph illustrating waveforms of reflected light signal RF and sampling timings in the optical information recording apparatus 104 of FIG. 15. FIG. 17 is a flowchart illustrating an exemplary operation for controlling the recording-power of the optical information recording apparatus 104. Referring to FIG. 15, the mark-state determining device 6 includes a bottom-hold device 10, a first sampling device 11, a second sampling device 15, and a divider 16. The bottom hold device 10 and the first sampling device 11 retrieve the bottom value Vsb of the reflected light signal RF, which will fluctuate with the intensity of the pedestal power Pp, a state of a recorded-mark M and the reflection coefficient RCs of "space" of the recording medium 3. The second sampling device 15 includes an analog to digital converter and samples and holds the saturated reflected light signal RF, which also will fluctuate with the intensity of the pedestal power Pp or by the reflection coefficient RCs of "space" of the recording medium 3.

Referring to FIG. 16, a line "b" illustrates a waveform of a reflected light signal RF reflected from an optimum mark with irradiation of pedestal power Pp. A line "bs" illustrates a waveform of a reflected light signal RF reflected from the optimum mark with irradiation of pedestal power Pds, which is greater than Pd. Lines "as" and "cs" illustrate waveforms of reflected light signals RF, which are reflected by a mark deviated from the optimum mark, such as "a" or "c" of FIG. 3, with irradiation of pedestal power Pds. "Vs" is the value of reflected light signal RF when the light spot LSP of the laser light is reflected from "space" area. The value of "Vs" can be changed, for example, to "VSS" as shown in FIG. 16, due to a change of the pedestal power Pds and a change of the reflection coefficient RCs of "space" of the recording medium 3.

In FIG. 17, the operations of steps S12, S13, S14, and S18 are substantially the same as those of FIG. 9. After the step S14, the bottom value Vsb of the reflected light signal RF is held by the bottom hold device 10. In step S25, at a time TS1 after t11, the first sampling device 11 retrieves the bottom value Vsb. Then, the first sampling device 11 converts the retrieved value into digital data and sends the data to the divider 16. In step S26, at a time TS2 after t11, the second sampling device 15 samples and holds the saturated value Vs, which is output when the light spot LSP of the laser light covers only "space" area. Then, the second sampling device 15 converts the retrieved value into digital data and sends the data into the divider 16. In step S27, the divider 16 divides the first-sampled data Vsb by the second-sampled data Vb, and then the quotient Vsb/Vb is sent to the laser control device 2 preparing for the operation of steps S12 and S13 of a next mark forming operation.

As described above, the mark-state signal Vdtc is obtained as Vsb/Vb, i.e., the mark-state signal Vdtc is normalized data. Accordingly, even if the pedestal power Pds or the reflection coefficient RCs of "space" of the recording medium 3 fluctuate, the mark-state signal Vdtc, i.e., Vsb/Vs can determine in a precise manner the fluctuation according to the state of a recorded-mark M formed in the steps S12 through S14.

In addition, the first sampling device 11 and the second sampling device 15 can be integrated into a single device so as to be used in a multiplexed manner. When two marks are apart in a short space, and thereby an enough time for sampling the Vs at TS2 is not available, the sampling can be skipped and postponed until two marks having a longer space appear. The length of a space between two marks depends on the information being recorded.

Figure 18:
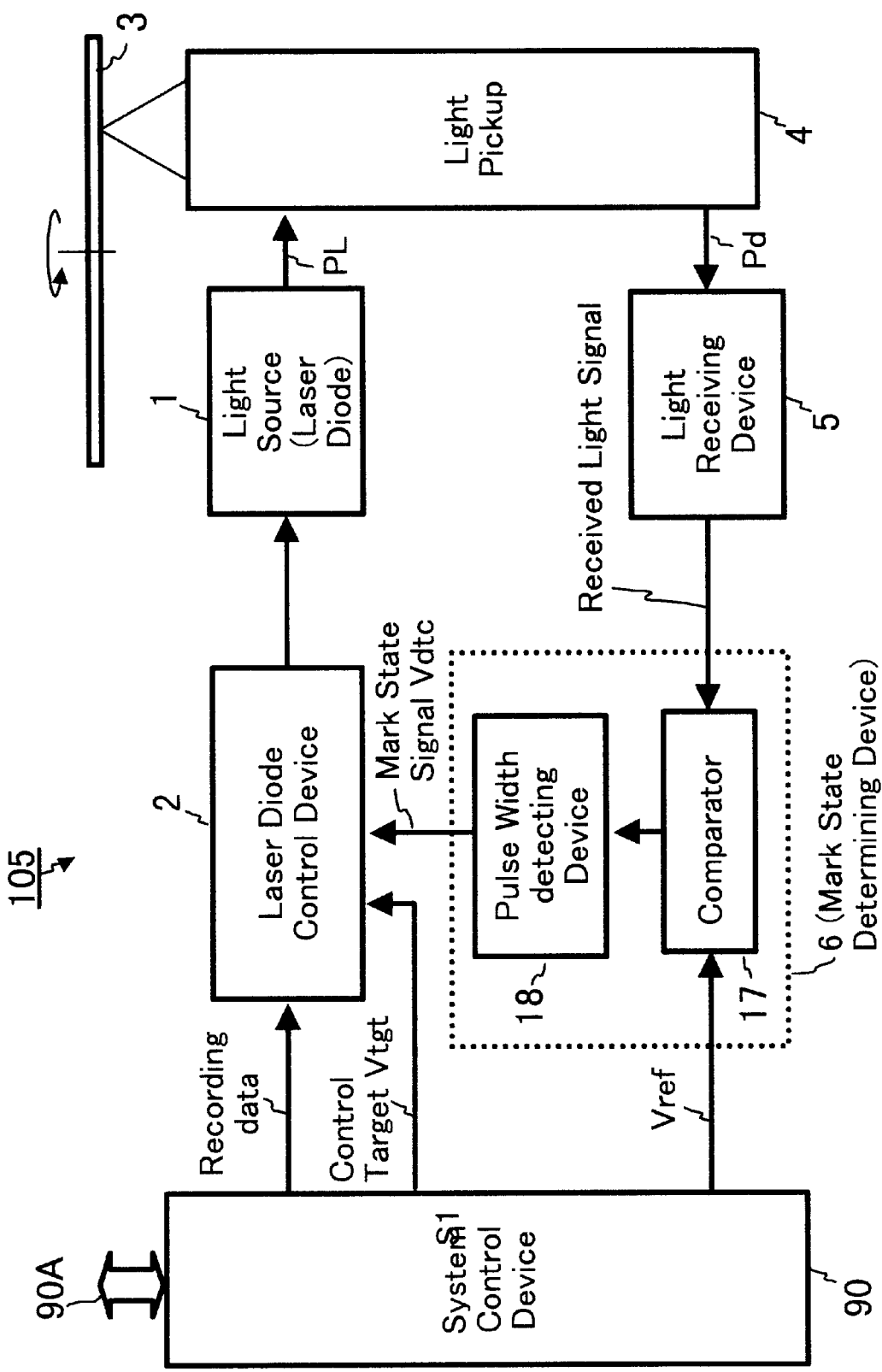
FIG. 18 is a functional block diagram illustrating an optical information recording apparatus according to still another embodiment of the present invention.

FIG. 18 is a functional block diagram illustrating an optical information recording apparatus according to still another embodiment of the present invention, in which the mark-state determining device 6 includes a comparator 17 and a pulse-width detecting device 18. The comparator 17 compares the reflected light signal RF and a reference value Vref as a threshold value, and generates a pulse according to the result of the comparison the detection. The pulse-width detecting device 18 detects the pulse generated by the comparator 17.

Figure 19:
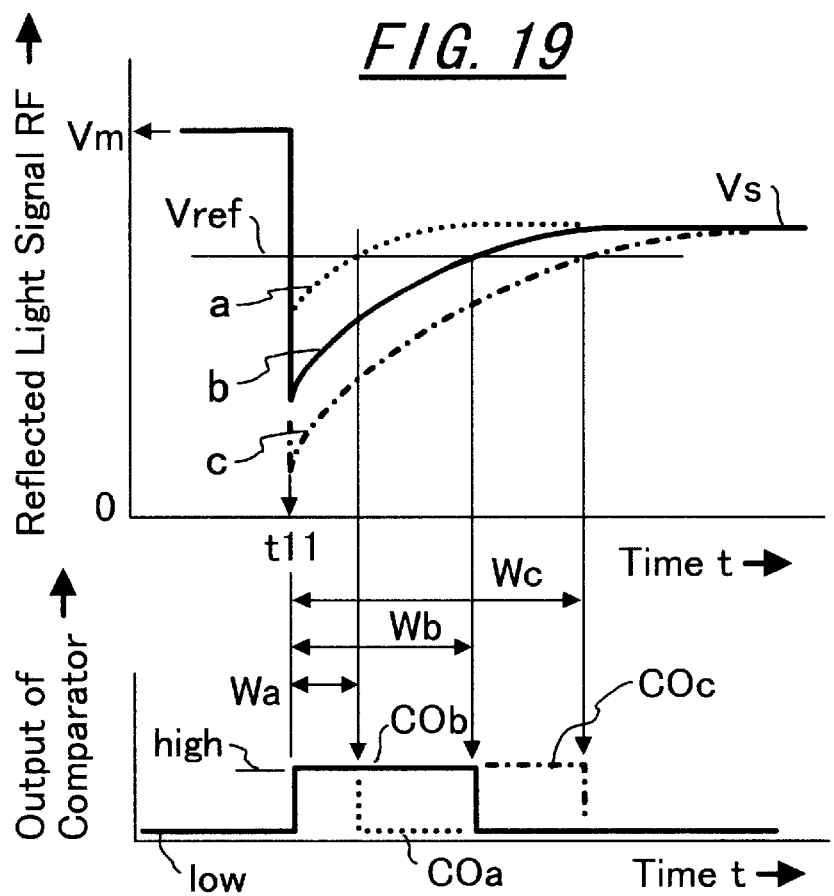
FIG. 19 is a graph illustrating waveforms of reflected light signal RF of the optical information recording apparatus of FIG. 18 and pulse generated by a comparator.

FIG. 19 is a graph illustrating waveforms of the reflected light signal RF of the optical information recording apparatus of FIG. 18 and pulse generated by the comparator 17. Referring to FIG. 19, waveforms COa, Cob, and COc are the output of the comparator 17. The reference value Vref is set below Vs, which is the value of reflected light signal RF when the light spot LSP of the laser light is reflected from "space" area. The comparator 17 outputs "high" at time t11, and turns the output to "low" when the reflected light signal RF reaches the reference value Vref. Thereby, when the reflected light signal RF is "b", the comparator 17 outputs a pulse COb having width Wb. Likewise, when the reflected light signal RF is "a", the comparator 17 outputs COa having width Wa, and when the reflected light signal RF is "c", the comparator 17 outputs COc having width Wc. Thus, the output pulse width of the comparator 17 depends upon a state of a recorded-mark M, i.e., when the recording power of laser diode 1 is too large, the output pulse width of the comparator 17 becomes wider than that of an optimum power, and vice versa.

Figure 20:
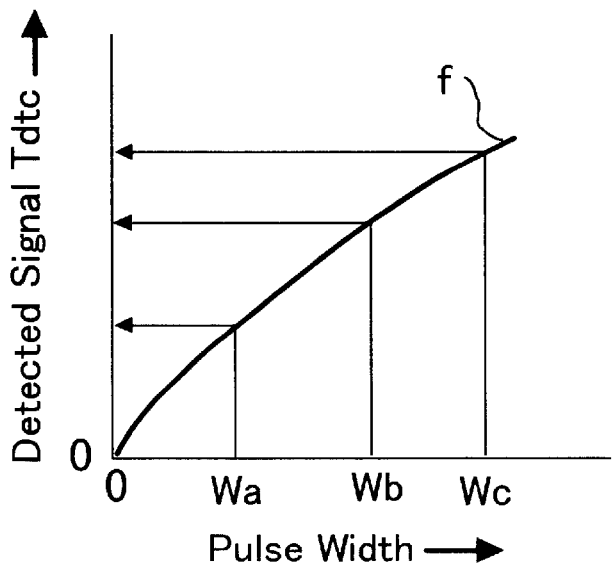
FIG. 20 is a graph illustrating a relation between input and output of a pulse-detecting device.

FIG. 20 is a graph illustrating a relation between input and output of the pulse-width detecting device 18. The pulse-width detecting device 18 converts the pulse output from the comparator 17 into a value, which is approximately proportional to the width of the pulse as shown in FIG. 20. The conversion from a pulse width to a value, such as a voltage, can be done by using a low pass filter. Then, the pulse-width detecting device 18 sends the converted value as a mark-state signal Vdtc to the laser diode control device 2.

The laser diode control device 2 controls the laser diode 1, according to the output of pulse-width detecting device 18, so as to form a recorded-mark such that a mark-state signal Vdtc from the recorded-mark coincides the control target Vtgt. The control target Vtgt is obtained using the comparator 17 and the pulse-width detecting device 18 at a test writing.

Figure 21:
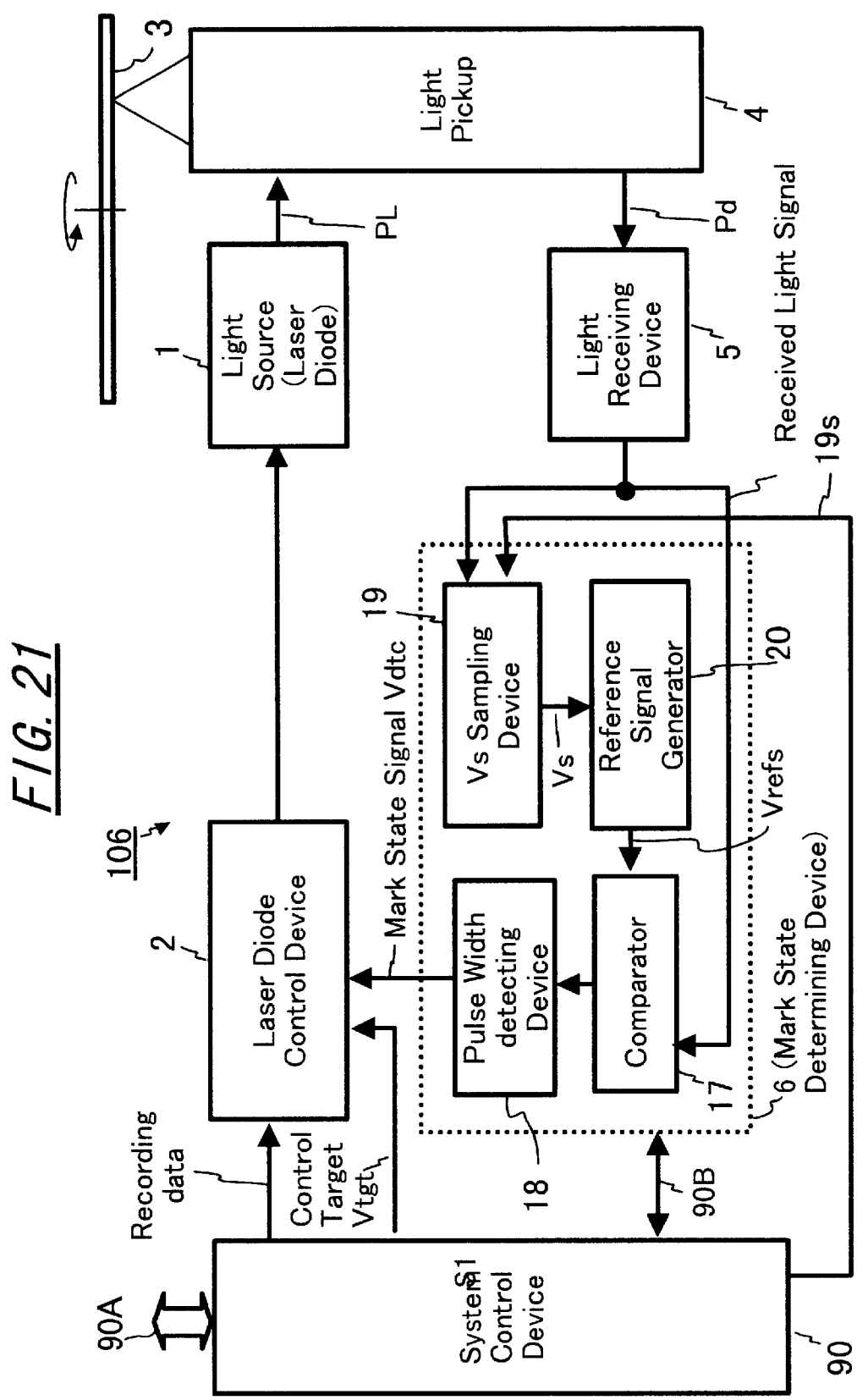
FIG. 21 is a functional block diagram illustrating an optical information recording apparatus according to still another embodiment of the present invention.
Figure 22:
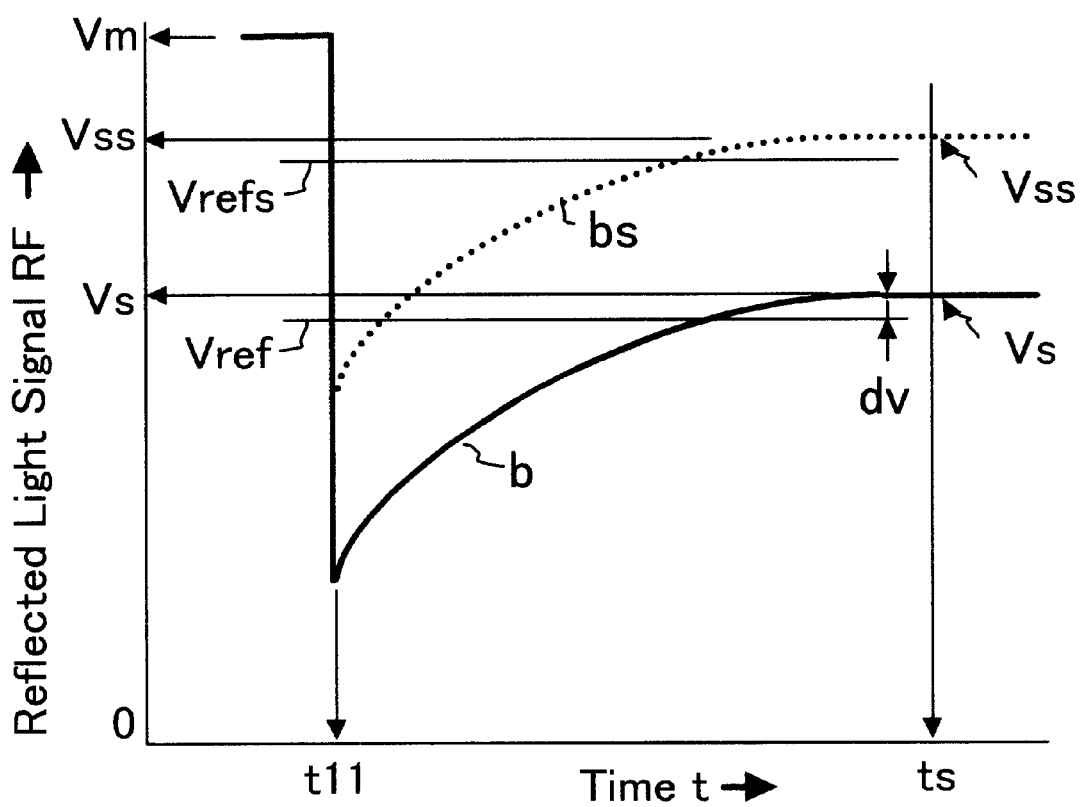
FIG. 22 is a graph illustrating waveforms of reflected light signal RF of the optical information recording apparatus of FIG. 21 and a reference value of a comparator.

FIG. 21 is a functional block diagram illustrating an optical information recording apparatus 106 according to still another embodiment of the present invention. FIG. 22 is a graph illustrating waveforms of reflected light signal RF of the optical information recording apparatus of FIG. 21. In the embodiment, a reference value Vref is a variable value that varies according to the reflected light signal RF from "space". Referring to FIG. 21 and FIG. 22, the mark-state determining device 6 includes a sampling device 19 for sampling the reflected light signal RF and a reference signal generator 20. The Vs sampling device 19 samples and holds the reflected light signal RF from "space", i.e., "Vs" at time ts in FIG. 22. The reference signal generator 20 generates a reference signal Vref according to the sampled and held Vs, for example, a value Vs itself or a value with offset dv from Vs. Then, the. reference signal generator 20 sets the reference signal Vref to the comparator 17. The setting of variable value reference signal Vref can be done at a test writing, which is performed, for example, every time when a recording medium 3 is changed.

The reflected light signal RF from "space" can be affected by the pedestal level irradiation power of the laser diode 1 or the reflection coefficient RCs of the recording medium 3 at "space". However, even if Vs, i.e., the reflected light signal RF from "space", is changed as "bs" shown in FIG. 22, the reference signal Vref is also changed to Vrefs as shown in FIG. 22. Thus, the comparator 17 can compare the reflected light signal RF with the modified reference value Vrefs, and correctly generate a pulse according to the detection. Accordingly, a fluctuation of the pedestal level irradiation power of the laser diode 1 or a deviation of the reflection coefficient RCs of the recording medium 3 is canceled, so that the recording power Pw is accurately controlled.

Figure 23:
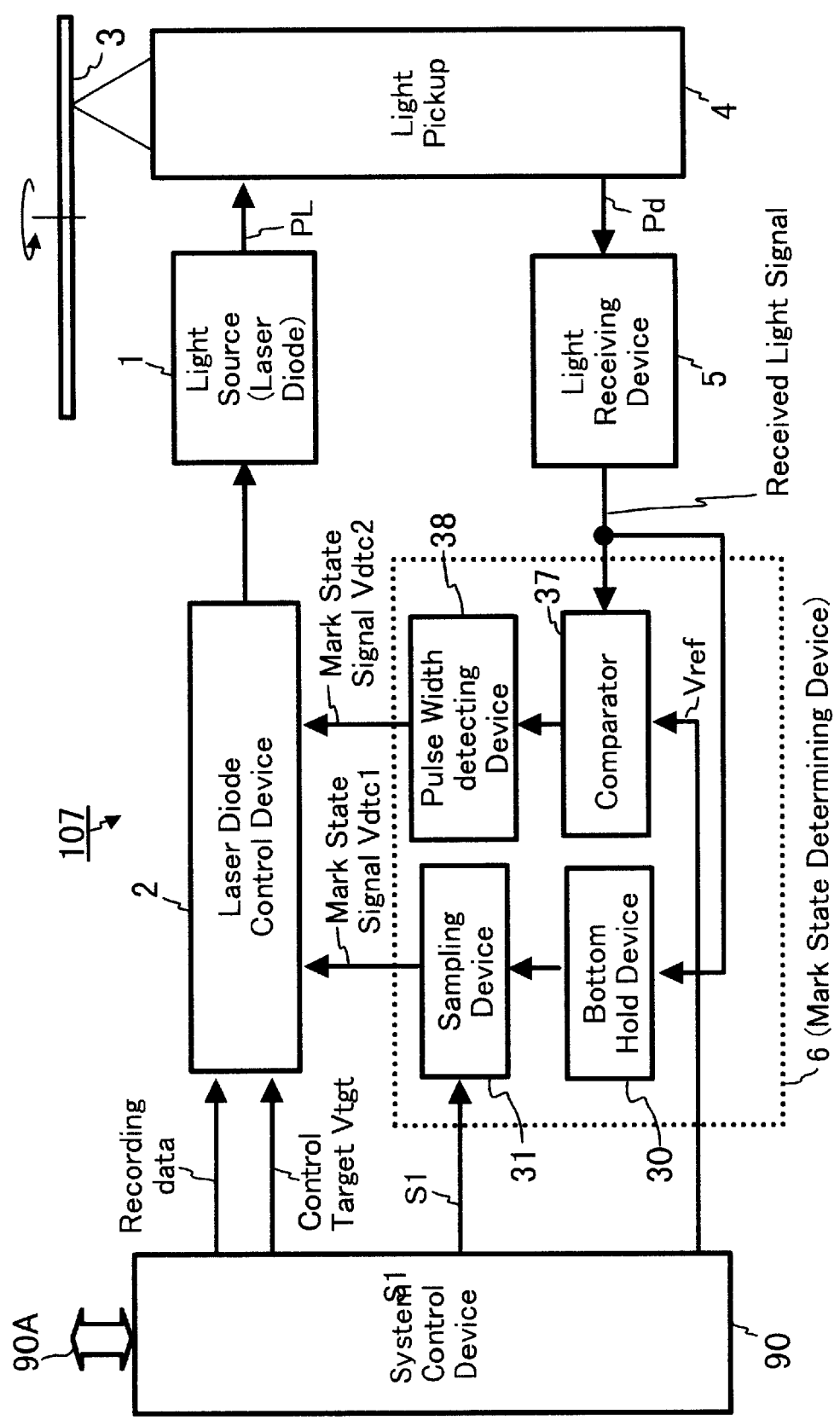
FIG. 23 is a functional block diagram illustrating an optical information recording apparatus according to yet another embodiment of the present invention.

FIG. 23 is a functional block diagram illustrating an optical information recording apparatus 107 according to still another embodiment of the present invention. In the embodiment, the mark-state determining device 6 includes a bottom-hold device 30, a sampling device 31, a comparator 37, and a pulse-detecting device 38. The comparator 37 compares the reflected light signal RF and a reference value Vref or a threshold value, and the comparator generates a pulse according to the result of the comparison detection. The bottom-hold device 30 holds a bottom or a minimum value of received light signals RF that is output from the light-receiving device 5. The sampling device samples or retrieves the held bottom value of received light signal RF by the bottom-hold device 30 and sends the data Vdtc1 as first feedback data to the laser diode control device 2.

The pulse-width detecting device 18 detects the pulse generated by the comparator 37, converts the pulse output from the comparator 37 into a value Vdtc2, which is approximately proportional to the width of the pulse, and sends the converted value Vdtc2 as second feedback data to the laser diode control device 2.

The laser diode control device 2 controls the laser diode 1 according to the Vdtc1 and Vdtc2 so as to form a recorded-mark such that a average value of the mark-state signals Vdtc1 and Vdtc2 coincides the control target Vtgt.

Figure 24A:
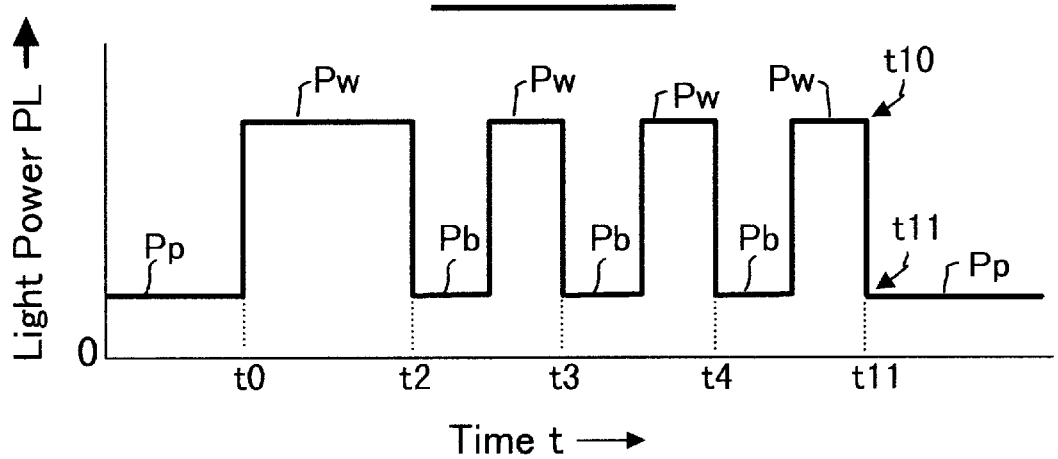
FIG. 24A is a graph illustrating waveforms of irradiation light power in a multiple-pulse recording method.

FIG. 24A is a graph illustrating a waveform of irradiation light power in a multiple-pulse recording method. In the FIG. 24A, "Pp" indicates pedestal power, "Pb" indicates bottom power, and "Pw" indicates a recording power. The pedestal power "Pp" can be equal to the bottom power "Pb". "t10" represents end of a plurality of recording pulses and "t11" represents start of the pedestal power "Pp". However, "t11" can be substantially at the same time as "t10". The waveform having a pulse train including four recording power Pw pulses is shown as an example of recording a mark of a specific length. The number of the recording power Pw pulses or the length of the pulse train varies depending upon data to be recorded. The number of the recording power Pw pulses can be, for example, from two to about ten.

Figure 24B:
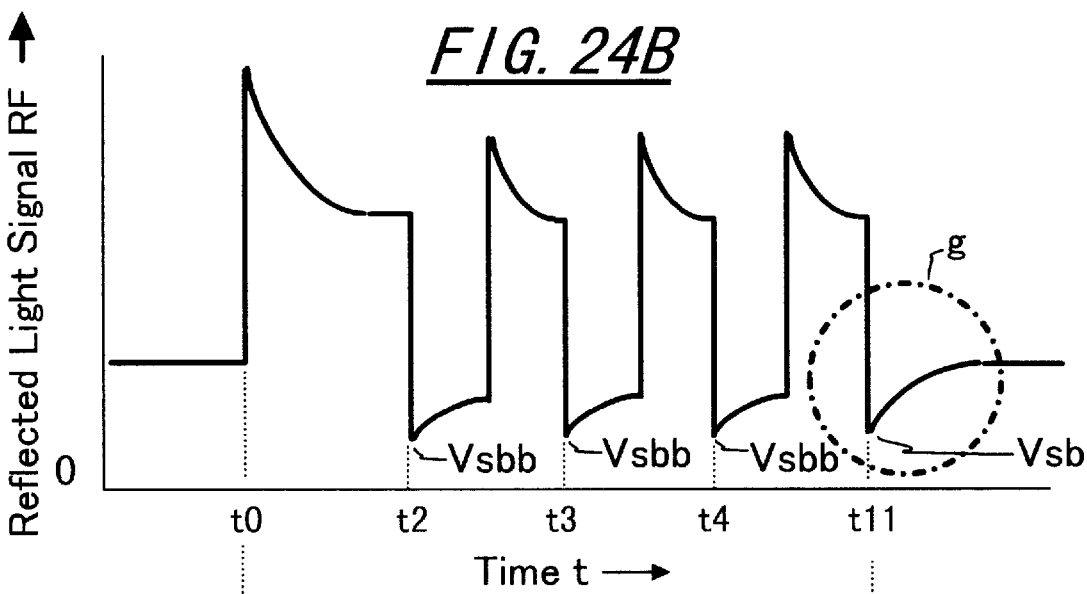
FIG. 24B is a graph illustrating waveforms of reflected light signal RF in the multiple-pulse recording method.
Figure 24C:
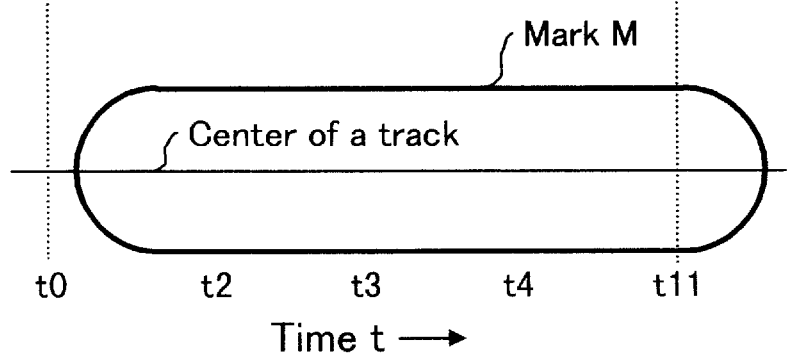
FIG. 24c illustrates a recorded-mark by the multiple-pulse recording method.

FIG. 24B is a graph illustrating a waveform of a reflected light signal RF in the multiple-pulse recording method with the same time axis as that of FIG. 24A. Between t0 to t11, the reflected light signal RF changes in a very short time such that detection of the reflected light signal RF can be possible with a detection device having a relatively fast operation speed. After t11, the waveform of a reflected light signal RF, which is circled and denoted as "g" in FIG. 24B, is substantially the same as that of the single-pulse recording method. Accordingly, all of the embodiments described above can be practiced, not only with the single-pulse recording method, but also with the multiple-pulse recording method. In addition, regardless of the single-pulse recording method or the multiple-pulse recording method, the waveform shape of a reflected light signal RF is affected only by a state of a recorded-mark. FIG. 24C illustrates an exemplary "mark" formed by the multiple-pulse recording method.

Figure 25:
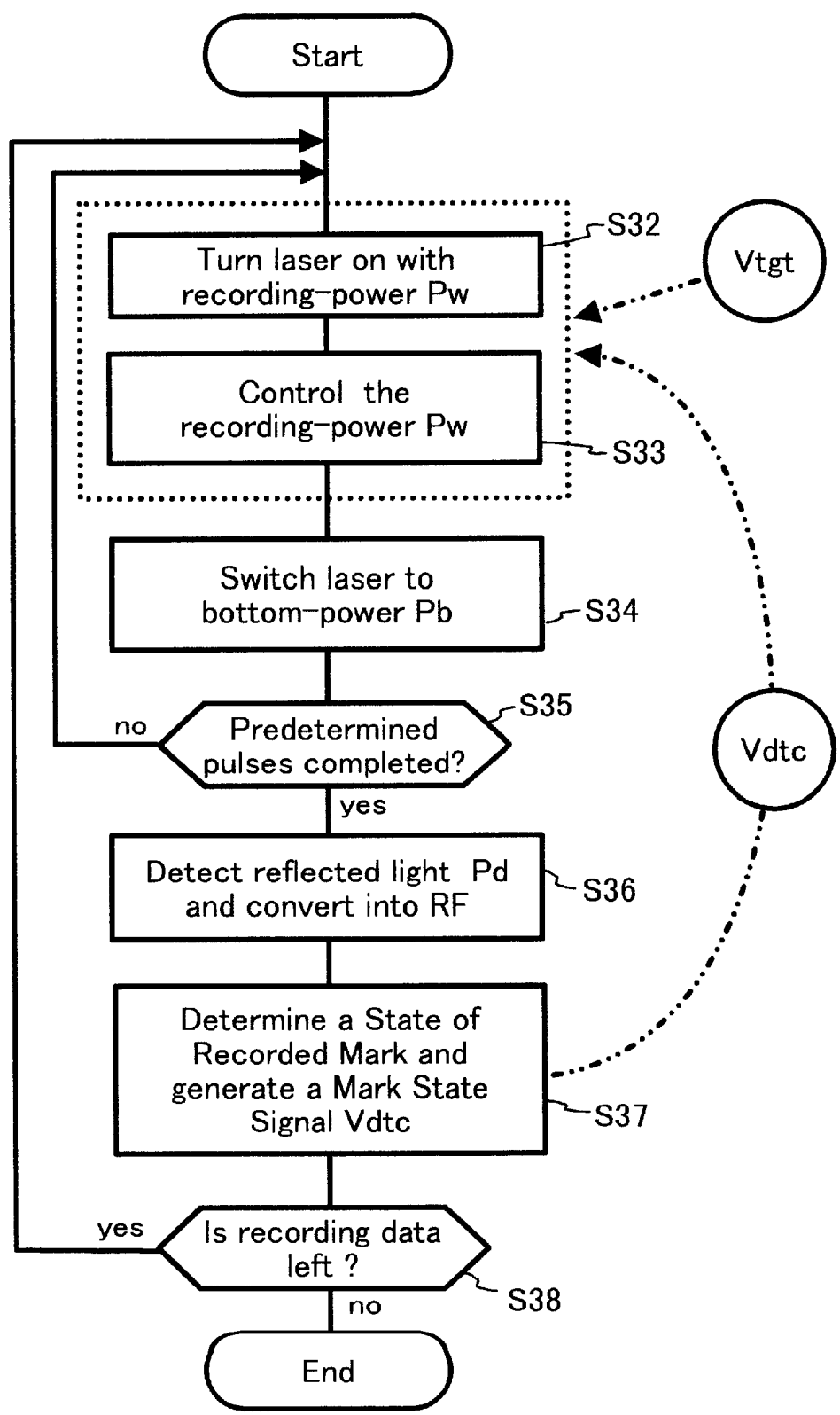
FIG. 25 is a flowchart illustrating the steps in a method for controlling the recording-power of the multiple-pulse recording method.

FIG. 25 is a flowchart illustrating an exemplary operation of controlling the recording-power of the optical information recording apparatus 101 of FIG. 1, which is practiced with the multiple-pulse recording method. In the step S32, the laser diode 1 starts irradiating the recording medium 3 with recording-power Pw at time to of FIG. 24A, and forming of a recorded-mark M is started. During the steps S32 and S33, the laser diode control device 2 controls the laser diode 1 so as to form a recorded-mark such that a mark-state signal Vdtc to coincide the control target Vtgt from the recording mark in step S37, utilizing a previously obtained mark-state signal Vdtc.

In step S34, at time t2 of FIG. 24A, the laser diode control device 2 switches the irradiation power of the laser diode 1 from the recording-power Pw to the bottom-power Pb. In Step S35, whether the number of operations corresponding to the number of recording pulses is completed is judged. When the number of operations corresponding to the number of recording pulses are completed at t10, the process proceeds to step S36, where the formation of a recorded-mark M is completed, and the shape of the recorded-mark M is formed in a shape shown as "Mark M" in FIG. 24C. In step S36, at time t11, the light-receiving device 5 receives the reflected light Pd from the recording medium 3 and converts the received light Pd into a received light signal RF. The received light signal RF has the waveform as shown after t11 in FIG. 24B.

In step S37, the mark-state determining device 6 determines a state of a recorded-mark by using the received light signal RF and generates a mark-state signal Vdtc as a feedback signal for a next recorded-mark formation. The mark-state determining device 6 can use, in addition to the received light signal RF, various information to detect the state of a recorded-mark as described before. In Step S38, whether there is more recording data to be recorded is judged.

Figure 26:
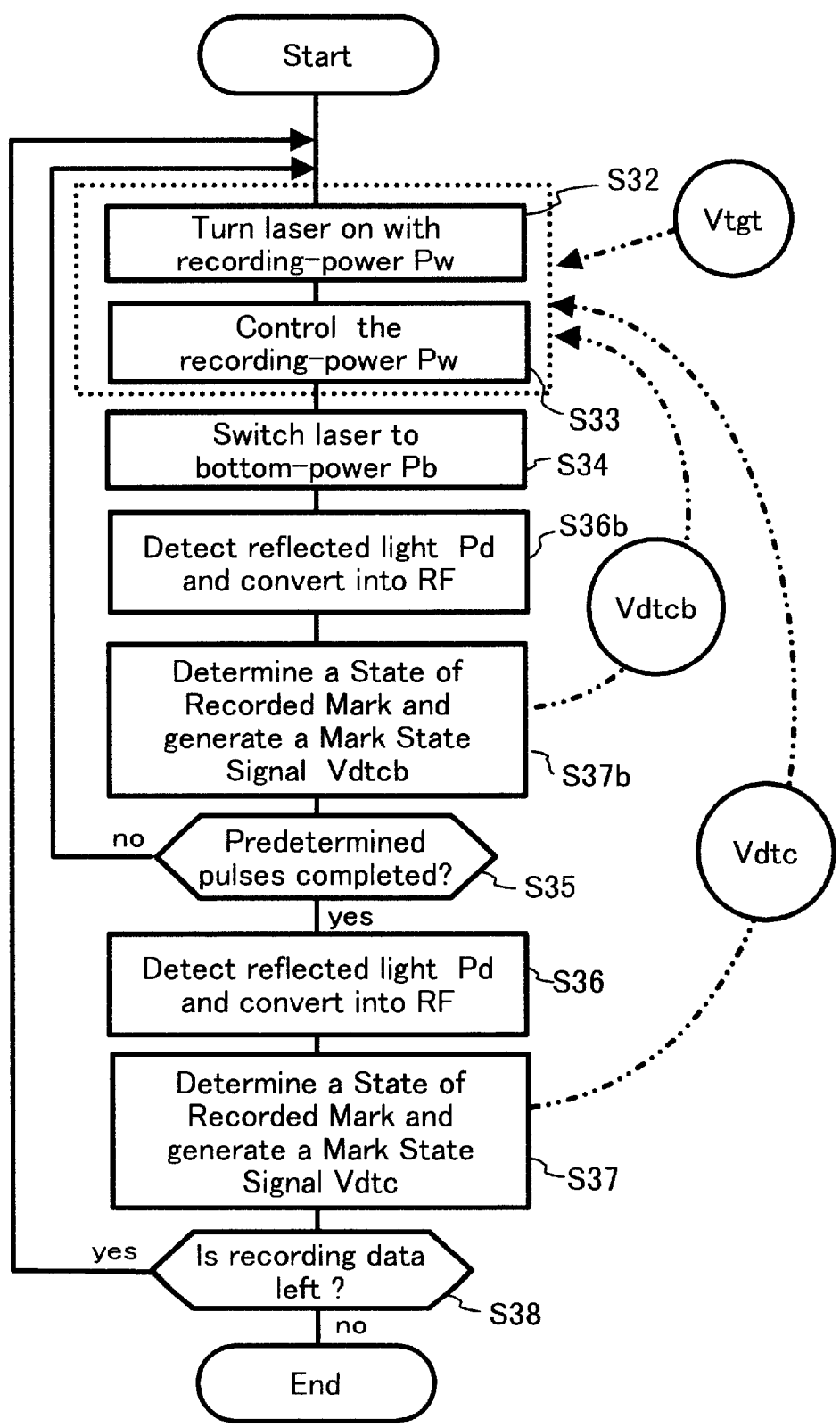
FIG. 26 is another flowchart illustrating the steps in a method for controlling the recording-power of the multiple-pulse recording method.

FIG. 26 is a flowchart illustrating another exemplary operation of controlling the recording-power. In this flowchart, the steps are substantially the same as those of FIG. 25 except step S36b, step S37b. In the step S36b, at each of times t2, t3, and t4, the light-receiving device 5 receives the reflected light Pd from the recording medium 3 and converts each of the received light Pd into a received light signal RF. The received light signal RF is obtained at each of times t2, t3, and t4, as shown as "Vsbb" in FIG. 24B.

In step S37b, the mark-state determining device 6 determines a state of a recorded mark by using the received light signal RF and generates a mark-state signal Vdtcb as a feedback signal for a next recorded-mark formation. When each of the received light signal RF "Vsbb" obtained at t2, t3, and t4 is close to the received light signal RF "Vsb" obtained at t11, the feedback signal Vdtcb can be a value similar to the Vdtc generated in the step S37.

Figure 27:
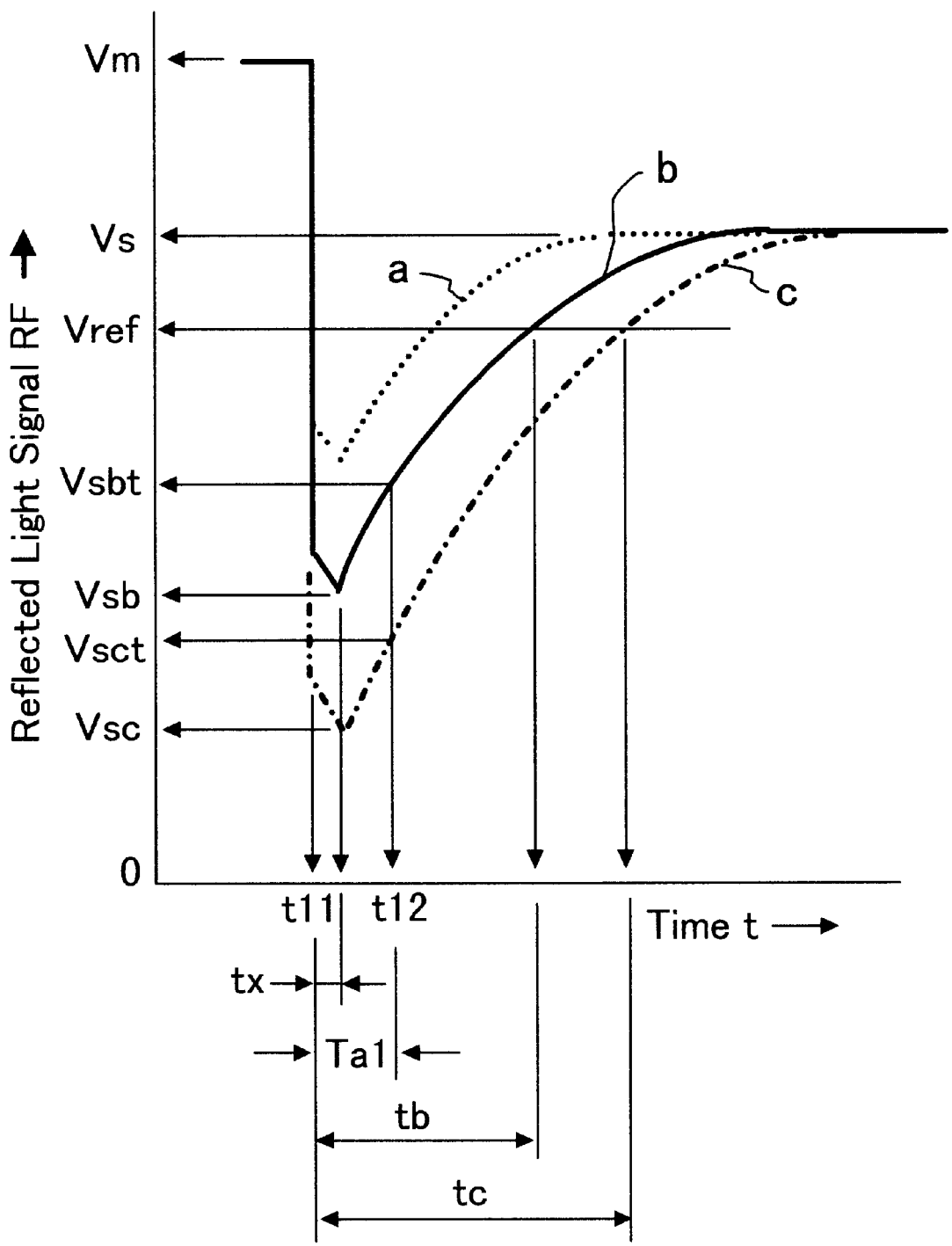
FIG. 27 is a graph illustrating waveform magnified of reflected light signal RF from a recording medium having a certain kind of heat sensitive recording layer.

As described above, the present invention can be applied for recording data on a recording medium 3 having a recording layer that is recordable by a heat-mode reaction by the irradiation of the laser diode 1. In the heat-mode recording, a mark M is recorded by a change of optical characteristics of the recording layer due to, for example, thermal decomposition of the recording layer, vaporization of the recording layer, or distortion of the substrate of recording medium 3 by the irradiation. Generally, sensitivity of the heat-mode recording medium is high, and the all methods and apparatuses described above can be applied for recording on recording medium 3 having a heat sensitive recording layer. A certain kind of heat sensitive recording layer that includes, for example, such as cyanine compounds has characteristics that is different from those of the described above. FIG. 27 is a graph illustrating waveforms of reflected light signal RF in the vicinity when a laser diode switched to output a pedestal power as a function of time for comparison to a state of a recorded mark on a recording medium having such a certain kind of heat sensitive recording layer. In FIG. 27, "b" illustrates a waveform of the reflected light signal RF on a mark recorded with an optimum irradiation power. As illustrated "b" of FIG. 27, the reflected light signal RF is different from that of the described above. The reflected light signal RF having a minimum value, shown as Vsb in FIG. 27, appears at a short time after the irradiation power changes from the recording power Pw to the pedestal power Pp.

Each of "a" and "c" illustrates a waveform of the reflected light signal RF from a mark recorded with power smaller or larger than the optimum irradiation power. For example, when recording power Pw is too large, the minimum value Vsb of the reflected light signal RF shifts to Vsc. Likewise, a value Vsbt of the reflected light signal RF at time after Ta1 from t11 shifts to Vsct. A time tb after from t11, i.e., time when the value of the reflected light signal RF reaches a reference value Vref shifts to tc as well. Accordingly, the all methods and apparatuses described above can be applied for recording on recording medium 3 having such the certain kind of recording layer.

Figure 28A:
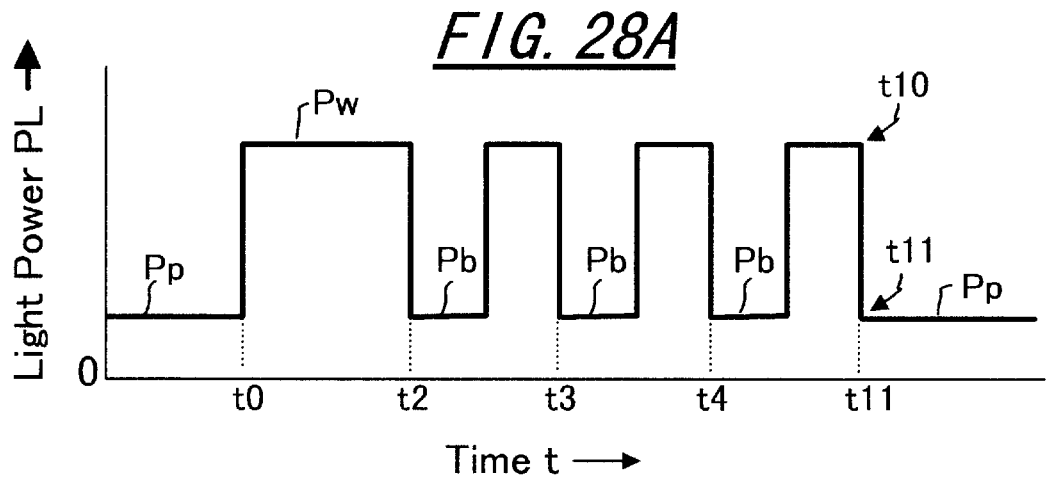
FIG. 28A is a graph illustrating a waveform of irradiation light power in a heat-mode recording with the multiple-pulse recording method.
Figure 28B:
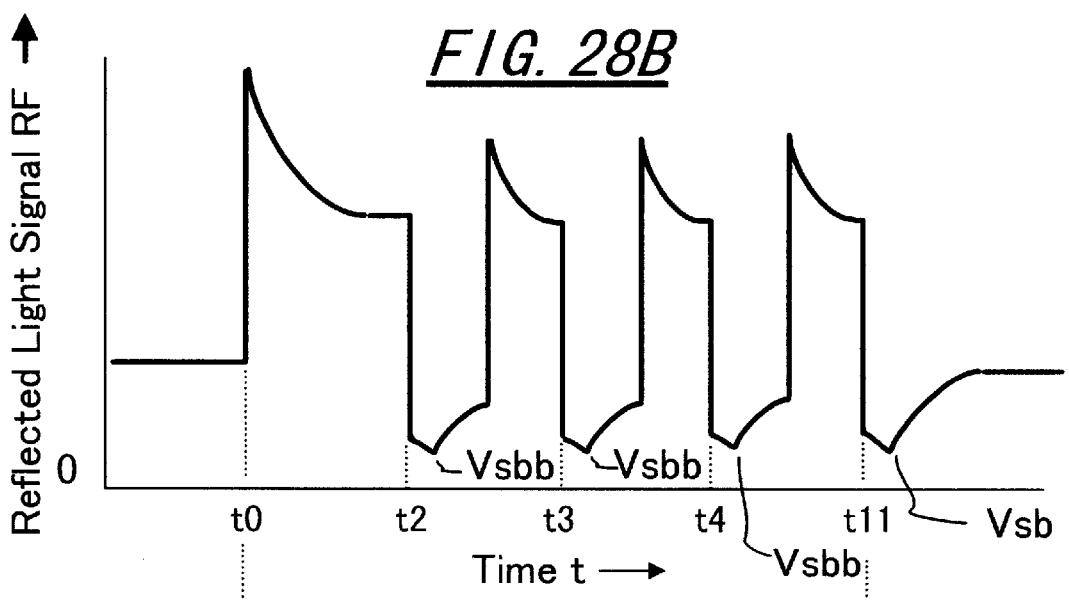
FIG. 28B is a graph illustrating a waveform of reflected light signal RF from a recording medium having a certain kind of heat sensitive recording layer with the multiple-pulse recording method.
Figure 28C:
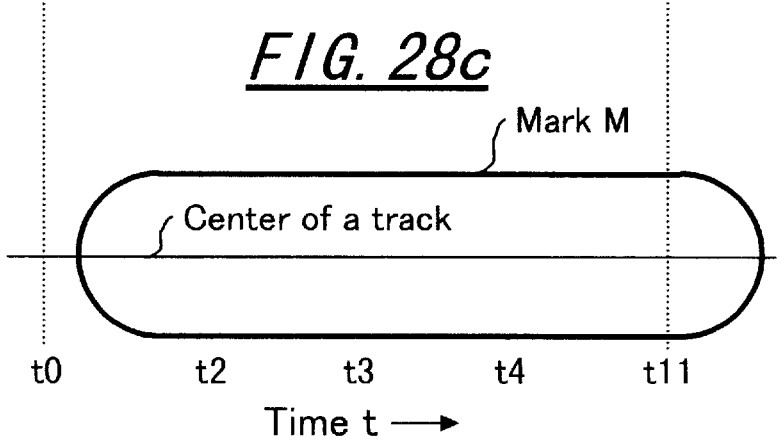
FIG. 28c illustrates a recorded-mark by the heat mode recording with the multiple-pulse recording method.

FIG. 28A, FIG. 28B, and FIG. 28C illustrate waveforms of irradiation light power, a waveform of reflected light signal RF of a recorded-mark on a recording medium having the certain kind of heat sensitive recording layer, and a recorded-mark in the multiple-pulse recording method in the heat mode recording.

As a material for heat-mode recording medium, for example, organic coloring agents, such as, dyes of polymethylene compounds, cyanine compounds, naphthalocyanine compounds, phthalocyanine compounds, squalirium compounds, pyrylium compounds, naphthoquinone compounds, anthraquinone compounds (indanthrene compounds), xanthene compounds, triphenylmethane compounds, azulene compounds, phenanthrene, triphenathiazine, and metal-complex compounds such as, azo compounds, can be utilized. These dyes can be dispersed in, compounded or stacked (multilayered) with other organic coloring agents, metals, and metal compounds. As the metals and metal compounds, for example, indium, tellurium, bismuth, selenium, antimony, germanium, stannum (tin), aluminum, beryllium, tellurium dioxide, stannic oxide, arsenic, and cadmium can be utilized. For forming the recording layer, for example, such as a vacuum evaporation method, a spattering method, a chemical vapour deposition method, and a solvent application method can be utilized. When the solvent application method is used, coloring agents described above are first dissolved in organic solvent, then the solution is applied on a substrate of a recording medium by, for example, a spray up method, a roller coating method, a dipping method, or a spin coating method.

The reaction velocity of the change of the optical characteristics of a recording layer while forming a recorded-mark on a recording medium varies depends on materials in the recording layer and thickness of the recording layer. When a certain kind of material is used, the optical change is not immediately completed when the irradiation light changes from the recording power Pw to the bottom power Pb or to the pedestal power Pp, and as a result, forming of a recorded-mark M is continued after the recording power Pw is switched to the pedestal power Pp. Referring to FIG. 27, reference symbol tx is substantially equivalent to an interval between t11 to the time of completing the formation of a recorded-mark M. The amount of tx is also affected by a transient time from a time when the irradiation light has the recording power Pw to a time when the irradiation light has the pedestal power Pp. The amount of tx is also affected by the recording velocity and the difference of the material of the recording layer.

As described above, an optical information recording method and optical information recording apparatus of the present invention are capable of forming an appropriate recorded-mark regardless of a recording medium or a recording method, by detecting a state of a recorded-mark and controlling the light source according to the determined state of the recorded-mark so as to output the recording power suitable for forming the appropriate recorded-mark.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patents of the United States is:

1. A method of optically recording information on a recording medium, comprising:
    irradiating the recording medium with an irradiation light of a recording power to form a recorded-mark on the recording medium such that a reflection coefficient from an area of the recorded-mark is different than a reflection coefficient from an area of the recording medium where the recorded-mark is not formed,
    modulating the irradiation light according to the information for recording to form the recorded-mark on the recording medium by changing the power of the irradiation light between the recording power and a non-recording power;
    receiving a reflection light of the irradiation light reflected by the recording medium and producing a corresponding light signal;
    determining a state of the recorded-mark based upon the light signal produced during a predetermined period of time immediately after power of the irradiation light changes to the non-recording power;
    controlling the recording power of the irradiation light according to the state of the recorded-mark;
    forming a plurality of test recording marks with a varied irradiation power on a predetermined area of the recording medium;
    receiving reflection light of the irradiation light reflected by the plurality of test recording marks and producing corresponding test light signals;
    storing in association each irradiation power and related test light signal; and
    determining an optimum pair of irradiation power and related test light signal as a control target value;
    said controlling step comprising, controlling the recording power of the irradiation light according to the state of the recorded-mark such that a value of the produced light signal becomes equivalent to the control target value.

2. An apparatus for optically recording information on a recording medium by irradiating the recording medium with an irradiation light of a recording power to form a recorded-mark on the recording medium such that a reflection coefficient from an area of the recorded-mark is different than a reflection coefficient from an area of the recorded-medium where the recorded-mark is not formed, the apparatus comprising:
    a laser diode configured to irradiate the recording medium with light to form the recording mark by changing the power of the irradiation light between a recording power and a non-recording power;
    a light receiving device configured to receive a reflection light of the irradiation light reflected by the recording medium and to produce a corresponding light signal;
    a mark-state determining device configured to determine a state of the recorded-mark based upon the light signal produced during a predetermined period of time immediately after power of the irradiation light changes to the non-recording power; and
    a laser diode control device configured to control the laser diode so as to modulate the recording power of the irradiation light according to the state of the recorded-mark, wherein
    the mark-state determining device comprises:
        a first sampling circuit configured to sample the light signal produced during a predetermined period of time immediately after power of the irradiation light changes to the non-recording power,
        a second sampling circuit configured to sample the light signal produced by a non-recorded area of the recording medium; and
        a divider configured to divide the sampled light signal by the first sampling device relative to the light signal sampled by the second sampling device.

3. An apparatus for optically recording information on a recording medium by irradiating the recording medium with an irradiation light of a recording power to form a recorded-mark on the recording medium such that a reflection coefficient from an area of the recorded-mark is different than a reflection coefficient from an area of the recorded-medium where the recorded-mark is not formed, the apparatus comprising:
    a laser diode configured to irradiate the recording medium with light to form the recording mark by changing the power of the irradiation light between a recording power and a non-recording power;
    a light receiving device configured to receive a reflection light of the irradiation light reflected by the recording medium and to produce a corresponding light signal;
    a mark-state determining device configured to determine a state of the recorded-mark based upon the light signal produced during a predetermined period of time immediately after power of the irradiation light changes to the non-recording power; and
    a laser diode control device configured to control the laser diode so as to modulate the recording power of the irradiation light according to the state of the recorded-mark, wherein
    the mark-state determining device is configured to determine the state of the recorded-mark based upon a period of time from a time when power of the irradiation light changes to the non-recording power to a time when the produced light signal reaches a predetermined value, and wherein the mark-state determining device comprises:

a comparator configured to compare the produced light signal with a predetermined reference value and to output a pulse; and a pulse width detector configured to detect the width of the output pulse.

4. The apparatus according to claim 3, wherein the mark-state determining device comprises:

a sampling circuit configured to sample the light signal produced by irradiation a non-recorded area of the recording medium; and, a reference value altering circuit configured to alter the reference value according to the light signal sampled by the sampling means such that the reference value has a value the same as the sampled light signal or a value that is a predetermined value smaller than the sampled light value.

5. An apparatus for optically recording information on a recording medium, comprising:

means for irradiating the recording medium with an irradiation light of a recording power to form a recorded-mark on the recording medium such that a reflection coefficient from an area of the recorded-mark is different than a reflection coefficient from an area of the recording medium where the recorded-mark is not formed;

means for modulating the irradiation light according to the information for recording to form the recorded-mark on the recording medium by changing the power of the irradiation light between the recording power and a non-recording power;

means for receiving a reflection light of the irradiation tight reflected by the recording medium and to produce a corresponding light signal;

means for determining a state of the recorded-mark based upon the light signal which is produced during a predetermined period of time immediately after power of the irradiation light changes to the non-recording power; and means for controlling the recording power of the irradiation light according to the state of the recorded-mark, wherein the means for determining comprises:

first sampling means for sampling the light signal produced during a predetermined period of time immediately after power of the irradiation light changes to the non-recording power;

second sampling means for sampling the light signal produced by a non-recorded area of the recording medium; and normalizing means to normalize the light signal sampled by the first sampling means relative to the light signal sampled by the second sampling means.

6. An apparatus for optically recording information on a recording medium, comprising:

means for irradiating the recording medium with an irradiation light of a recording power to form a recorded-mark on the recording medium such that a reflection coefficient from an area of the recorded-mark is different than a reflection coefficient from an area of the recording medium where the recorded-mark is not formed;

means for modulating the irradiation light according to the information for recording to form the recorded-mark on the recording medium by changing the power of the irradiation light between the recording power and a non-recording power;

means for receiving a reflection light of the irradiation light reflected by the recording medium and to produce a corresponding light signal;

means for determining a state of the recorded-mark based upon the light signal which is produced during a predetermined period of time immediately after power of the irradiation light changes to the non-recording power; and means for controlling the recording power of the irradiation light according to the state of the recorded-mark, wherein the determining means determines the state of the recorded-mark based upon a period of time from a time when power of the irradiation light changes to the non-recording power to a time when the produced light signal reaches a predetermined value, and wherein the determining means comprises:

comparing means for comparing the produced light signal with a predetermined reference value and for outputting a pulse; and pulse width detecting means for detecting the width of the pulse.

7. The apparatus according to claim 6, wherein the said determining means comprises:

sampling means for sampling a light signal produced by irradiation of a non-recorded area of the recording medium; and, reference value altering means for altering the reference value according to the light signal sampled by the sampling means such that the reference value has a value the same as the sampled light signal or a value that is a predetermined value smaller than the sampled light value.

* * * * *